(12) United States Patent
Weaver

(10) Patent No.: US 10,108,069 B2
(45) Date of Patent: Oct. 23, 2018

(54) ELECTROMAGNETIC EFFECT RESISTANT SPATIAL LIGHT MODULATOR

(71) Applicant: THE BOEING COMPANY, Chicago, IL (US)

(72) Inventor: Thomas L. Weaver, Webster Groves, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/414,072

(22) Filed: Jan. 24, 2017

(65) Prior Publication Data

US 2018/0210313 A1    Jul. 26, 2018

(51) Int. Cl.
*G02F 1/29* (2006.01)
*G02B 27/00* (2006.01)
*H04N 5/238* (2006.01)

(52) U.S. Cl.
CPC ......... *G02F 1/293* (2013.01); *G02B 27/0068* (2013.01); *G02F 1/29* (2013.01); *H04N 5/238* (2013.01); *G02F 2202/36* (2013.01); *G02F 2203/18* (2013.01)

(58) Field of Classification Search
CPC ........ G02F 1/293; G02F 1/29; G02F 2202/36; G02F 2203/18; G02B 27/0068; H04N 5/238
USPC ................................. 359/244, 241, 238, 237
See application file for complete search history.

(56) References Cited

U.S. PATENT DOCUMENTS

| 6,343,766 | B1 * | 2/2002 | Livingston | F41H 13/005 244/3.11 |
| 7,485,835 | B2 | 2/2009 | Weaver | |
| 7,772,543 | B2 * | 8/2010 | Grier | B82B 3/00 250/251 |
| 7,847,238 | B2 * | 12/2010 | Grier | G03H 1/08 250/251 |
| 7,981,774 | B2 * | 7/2011 | Grier | B82Y 20/00 257/E21.53 |
| 8,013,359 | B2 | 9/2011 | Pettit | |
| 8,044,866 | B2 | 10/2011 | Weaver | |
| 8,174,742 | B2 * | 5/2012 | Roichman | G03H 1/0005 250/251 |
| 8,217,331 | B2 | 7/2012 | Weaver et al. | |
| 9,318,808 | B1 | 4/2016 | Weaver et al. | |

(Continued)

OTHER PUBLICATIONS

Mawet, D., "High contrast imaging with the L-band vortex coronagraph at Keck/NIRC2,", 2015, 27 pgs.

(Continued)

*Primary Examiner* — William R Alexander
(74) *Attorney, Agent, or Firm* — Toler Law Group, P.C.

(57) ABSTRACT

A reconfigurable optical device includes a spatial light modulator and an optical signal generator. The spatial light modulator includes a layer of optically-sensitized carbon nanotubes, and each optically-sensitized carbon nanotube is configured to transition between a conductive state and a semiconductive state responsive to an optical signal. The optical signal generator is configured to provide the optical signal to the spatial light modulator to cause the layer of optically-sensitized carbon nanotubes to form a pattern of conductive nanotubes, the pattern of conductive nanotubes configured to modify interfering signal to form an optical vortex.

22 Claims, 7 Drawing Sheets

(56) References Cited

U.S. PATENT DOCUMENTS

| | | | |
|---|---|---|---|
| 2005/0186565 A1* | 8/2005 | Malak | B82Y 5/00 435/5 |
| 2009/0002790 A1* | 1/2009 | Plewa | B82Y 10/00 359/35 |
| 2009/0108190 A1* | 4/2009 | Plewa | B82Y 10/00 250/251 |
| 2013/0176167 A1* | 7/2013 | Bergeron | G01S 13/9005 342/25 F |

OTHER PUBLICATIONS

Mawet, D., et al., "High Contrast Imaging with the New Vortex Coronagraph on NACO,", Telescopes and Instrumentation, Jun. 2013, The Messenger, vol. 152,, 6 pgs.

Mawet, D., et al., "Optical Vectorial Vortex Coronagraphs using Liquid Crystal Polymers: theory, manufacturing and laboratory demonstration," Optical Society of America, Feb. 2, 2009, Optics Express, vol. 17, No. 3, 17 pgs.

Mawet, D., et al., "Recent results of the second generation of vector vortex coronagraphs on the high-contrast imaging testbed at JPL," Techniques and Instrumentation for Detection of Exoplanets, 2011, Proceedings of SPIE, vol. 8151, 8 pgs.

Mawet, D., et al., "The four-quadrant phase-mask coronagraph: white light laboratory results with an achromatic device," 2006, Astronomy and Astrophysics, vol. 448, pp. 801-808.

Swartzlander, G., "Optical Vortex Coronagraph—The Hunt for Habitable Planets,"Rochester Institute of Technology, Apr. 18, 20019, Astro, Soc. NY, Rochester, NY,, 24 pgs.

* cited by examiner

ELECTROMAGNETIC EFFECT RESISTANT SPATIAL LIGHT MODULATOR

FIELD OF THE DISCLOSURE

The present disclosure is generally related to spatial light modulators and optical vortices.

BACKGROUND

A vortex optical element can be used to generate an optical vortex and to allow an imaging system to capture an image of a relatively dim object or light source that is near a much brighter object or light source. For example, the vortex optical element can spiral or twist incoming light in a manner that generates a null reading of an intensity of the incoming light from the brighter object or light source. To illustrate, fixed optics (e.g., non-reconfigurable lens or filters) can be used in telescopes to image relatively dim objects (e.g., planets) near brighter objects (e.g., distant stars) by generating an optical vortex. The fixed optics are designed to modify incoming light from the brighter object having a particular wavelength. The fixed optics cannot be reconfigured for use with incoming light from another bright object that has a different wavelength.

SUMMARY

In a particular implementation, a reconfigurable optical device includes a spatial light modulator and an optical signal generator. The spatial light modulator includes a layer of optically-sensitized carbon nanotubes, and each optically-sensitized carbon nanotube is configured to transition between a conductive state and a semiconductive state responsive to an optical signal. The optical signal generator is configured to provide the optical signal to the spatial light modulator to cause the layer of optically-sensitized carbon nanotubes to form a pattern of conductive nanotubes, the pattern of conductive nanotubes configured to modify an interfering signal to form an optical vortex.

In another particular implementation, an imaging system includes a spatial light modulator, an optical signal generator, and an image sensor. The spatial light modulator includes a layer of optically-sensitized carbon nanotubes, and each optically-sensitized carbon nanotube is configured to transition between a conductive state and a semiconductive state responsive to an optical signal. The optical signal generator is configured to provide the optical signal to the spatial light modulator to cause the layer of optically-sensitized carbon nanotubes to form a pattern of conductive nanotubes, the pattern of conductive nanotubes configured to modify interfering signal to form an optical vortex. The image sensor is configured to capture a reflection signal and to generate image data based on the reflection signal. The spatial light modulator is configured to receive the reflection signal corresponding to reflected light from an image target and to direct the reflection signal to the image sensor.

In another particular implementation, a method for generating an optical vortex includes determining a pattern of conductive nanotubes based on a source of interfering signal. The pattern of conductive nanotubes is configured to modify an interfering signal to form the optical vortex. The method also includes providing an optical signal corresponding to the pattern of conductive nanotubes to a spatial light modulator. The spatial light modulator includes a layer of optically-sensitized carbon nanotubes, and each optically-sensitized carbon nanotube is configured to transition between a conductive state and a semiconductive state responsive to the optical signal. The optical signal causes the layer of optically-sensitized carbon nanotubes to form the pattern of conductive nanotubes.

DETAILED DESCRIPTION

Figure 1:
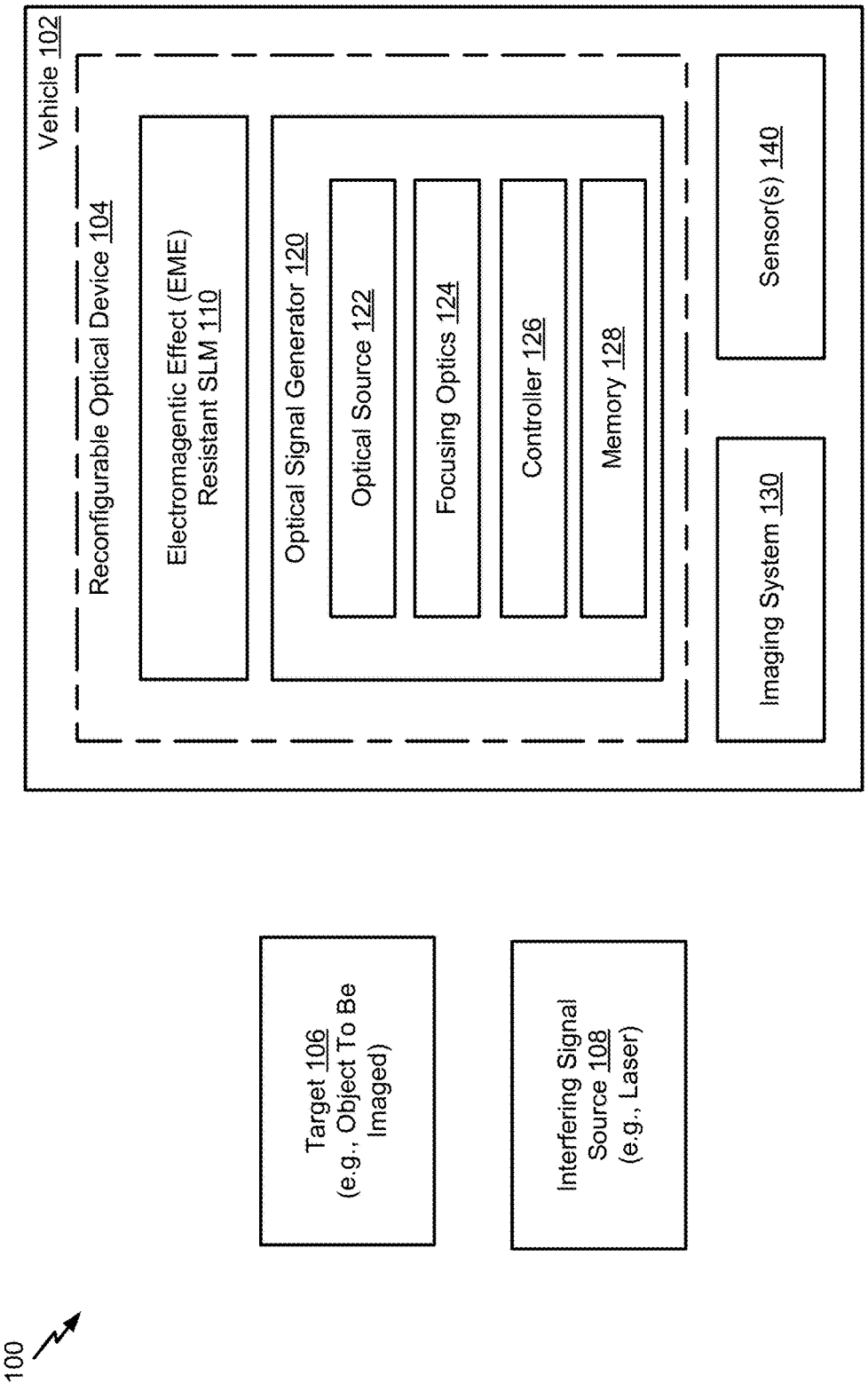
FIG. 1 is a block diagram that illustrates an example of a vehicle that includes a reconfigurable optical device.

Implementations disclosed herein are directed to electromagnetic effect (EME) resistant spatial light modulators (e.g., reconfigurable vortex optical elements). An EME resistant spatial light modulator is controlled by an optical signal generator. The EME resistant spatial light modulator includes a layer of optically-sensitized carbon nanotubes. Each optically-sensitized carbon nanotube is configured to transition between a conductive state and a semiconductive state responsive to an optical signal received from the optical signal generator. The optical signal generator is configured to generate and provide (e.g., direct) the optical signal to the EME resistant spatial light modulator to cause the layer of optically-sensitized carbon nanotubes to form a pattern of conductive nanotubes. To illustrate, the layer of optically-sensitized carbon nanotubes forms first regions that include conductive nanotubes and are arranged in a pattern and forms second regions that include semiconductive nanotubes. The pattern of conductive nanotubes is configured to modify incoming light (e.g., an incoming laser beam) to form an optical vortex in the incoming light that has been modified by either reflecting off or passing through the EME resistant spatial light modulator. The optical vortex alters the incoming light such that its intensity is reduced in particular directions within the path of the incoming light. For example, the optical vortex may cause the light of an incoming laser beam to destructively interfere with itself on its central axis to enable imaging of a target near a source of the laser beam. The target may include a stationary object or a moving object. In some implementations, the target may include the source of the laser beam.

In some implementations, the optical vortex corresponds to a vectorial type optical vortex. A vectorial optical vortex has a geometric phase and modifies a transverse polarization state of the incoming light based on the pattern (e.g., a space-variant birefringent optical element), as opposed to scalar optical vortices which have a longitudinal phase that modifies both polarization states (e.g., ordinary waves and extraordinary waves) of the incoming light. A vectorial optical vortex may have rotational symmetry. In such implementations, the pattern (e.g., a vectorial optical vortex element) may correspond to a half-wave plate in which optical axes of the half-wave plate rotate around a center of the pattern to form the vectorial optical vortex.

Energy (e.g., electromagnetic fields) from the incoming light may interfere with and disrupt electronic devices and electrical controls of otherwise robust or shielded devices. The optically-sensitized carbon nanotubes are inherently resistant to electromagnetic interference at frequencies less than that of the light that controls the optically-sensitized carbon nanotubes, and thus a spatial light modulator incorporating the optically-sensitized carbon nanotubes can be EME resistant. As the EME resistant spatial light modulator is controlled optically rather than electrically, control signals of the EME resistant spatial light modulator are also resistant to EME. To illustrate, the EME resistant spatial light modulator is resistant to EME from light with wavelengths greater than a wavelength of the optical signal. The optically-sensitized carbon nanotubes are configured to be activated by (e.g., to absorb) the optical signal (e.g., light of the optical signal) having a first wavelength and are configured to not be activated by (e.g., remain inactive due to) an interfering signal having wavelengths greater than the first wavelength. Because the EME resistant spatial light modulator and its controls are both resistant to EME, the EME resistant spatial light modulator can be used to protect imaging systems from very bright electromagnetic sources, such as laser weapons, laser targeting systems, and high power microwave weapons.

The EME resistant spatial light modulator and the optical signal generator may be part of a reconfigurable optical device. The reconfigurable optical device may be part of an imaging system. The reconfigurable optical device may diffract the interfering signal while directing (e.g., reflecting) reflected light (e.g., a reflection signal) from a target to be imaged near the source of the interfering signal to the imaging system. Additionally or alternatively, the reconfigurable optical device may direct light transmitted from the target to the imaging system. The imaging system may be included on a vehicle, such as an aircraft.

As compared to fixed optics spatial light modulators, the EME resistant spatial light modulator can be reconfigured to protect against different types of light sources (e.g., lasers having different wavelength ranges). Additionally, the EME resistant spatial light modulator can be reconfigured to protect against adjustable light sources or movable light sources. As an example, the pattern of the EME resistant spatial light modulator can be adjusted for movement faster than fixed optics spatial light modulators. To illustrate, the optical signal generator may adjust the optical signal projected onto the EME resistant spatial light modulator (and the resulting pattern) faster than actuators can adjust physical optics of the fixed optics spatial light modulator. Additionally, the EME resistant spatial light modulator can protect against multiple light sources (including lasers of different types) concurrently. Further, the EME resistant spatial light modulator may be smaller and lighter than fixed optics spatial light modulators. To illustrate, the EME resistant spatial light modulator is controlled optically instead of mechanically, and therefore the EME resistant spatial light modulator includes less mechanical equipment (e.g., actuators) than the fixed optics spatial light modulators. Additionally, the EME resistant spatial light modulator may be more reliable than fixed optics spatial light modulators because the EME resistant spatial light modulator includes less mechanical equipment.

The EME resistant spatial light modulator can be utilized to protect an imaging system from laser attacks. For example, the EME resistant spatial light modulator can be controlled with relatively short wavelength light (e.g., blue light or ultraviolet light) as compared to wavelengths of high intensity light sources, laser weapons, and microwave weapons. Short wavelength light may be difficult to produce at high energies and may not propagate well through the atmosphere. Accordingly, short wavelength light is generally not used in high intensity light sources and laser weapons, and is not present in the output of microwave weapons. Because electromagnetic attacks generally use longer wavelengths than a wavelength of the disclosed control signals, the energy per photon of the incoming light (or electromagnetic radiation) may be insufficient to trigger a change in a pattern of the EME resistant spatial light modulator. Accordingly, incoming light from a light source (e.g., a laser) or any other lower frequency (i.e., longer wavelength) electromagnetic radiation, such as a microwave based weapon, may not affect the EME resistant spatial light modulator. Thus, an EME resistant spatial light modulator system can block a laser attack and is unlikely to be spoofed or overridden by EME effects of the laser attack. Additionally, though it is theoretically possible for a microwave based weapon to have a particular energy density (e.g., energy per unit area) that is high enough to disrupt the EME resistant spatial light modulator, the particular energy density of such a weapon would likely exceed the energy density that can be propagated through the Earth's atmosphere. For example, the amount of energy density to disrupt the EME resistant spatial light modulator may be greater than a threshold amount of energy density (e.g., two million volts per meter) that the Earth's atmosphere is capable of transmitting before ionization of the Earth's atmosphere. Accordingly, the EME resistant spatial light modulator may be immune to EME from electromagnetic sources with wavelengths greater than the first wavelength of the optical signal.

FIG. 1 illustrates an example of a diagram 100 that includes a vehicle 102, a target 106, and an interfering signal source 108. The vehicle 102 includes a reconfigurable optical device 104, an imaging system 130, and one or more sensors 140. The reconfigurable optical device 104 includes an EME resistant spatial light modulator 110 and an optical signal generator 120. The reconfigurable optical device 104 enables images to be captured of the target 106 by the imaging system 130 while the interfering signal source 108 (e.g., a laser weapon or laser targeting system) is projecting an interfering signal (such as interfering signal 352 described below) at the vehicle 102. As illustrated in FIG. 1, the reconfigurable optical device 104 is included on the vehicle 102. In various implementations, the vehicle 102 may be an aircraft, a helicopter, an airship, a satellite, a spacecraft, a rocket, a ship, or any other mobile device. Optionally, the reconfigurable optical device 104 may be installed on a stationary structure such as a building. Additionally, although the interfering signal source 108 is described as a laser, the interfering signal source 108 may be another light source (e.g., a focused light source, a spotlight, etc.) that is much brighter than the target 106. More specifically, the interfering signal source 108 may a greater luminous flux and thus emits a higher quantity of visible light than the target 106. Alternatively, the interfering signal source 108 may be a microwave energy source.

The EME resistant spatial light modulator 110 is optically controlled and is configured to cause generation of optical vortices responsive to an optical signal (e.g., light of the optical signal). The EME resistant spatial light modulator 110 includes a layer of optically-sensitized carbon nanotubes. The optically-sensitized carbon nanotubes are configured to transition between a conductive state and a semiconductive state responsive to the optical signal received from the optical signal generator 120. The optically-sensitized carbon nanotubes and the layer of optically-sensitized carbon nanotubes are described further with reference to FIG. 2A.

The EME resistant spatial light modulator 110 is configured to modify the interfering signal to form an optical vortex. The layer of optically-sensitized carbon nanotubes forms a pattern of conductive nanotubes responsive to receiving the optical signal. The pattern of conductive nanotubes of the EME resistant spatial light modulator 110 is configured such that the interfering signal is modified to form the optical vortex upon impinging on the EME resistant spatial light modulator 110. The optical vortex reduces an intensity of the interfering signal. To illustrate, light of the interfering signal is twisted into a helix around its axis of travel. Modifying the interfering signal into the optical vortex causes the interfering signal to experience destructive interference. In a particular example, modifying the interfering signal produces a first ring of light with a singularity (e.g., a singular point or region of zero intensity) at a center of the first ring, and one or more relatively fainter rings of light surrounding the first ring of light. The one or more rings of light have lower intensities than the central ring of light which has been partially canceled. Each succeeding ring of light from the center has a lower intensity than a previous ring of light. Because the one or more rings of light are of lower intensity (as compared to an intensity of the incoming interfering signal), the imaging system 130 can compensate for the lower intensity light of the one or more rings of light and may not be damaged by the lower intensity light. The EME resistant spatial light modulator 110 may function as a half-wave plate. In such implementations, the EME resistant spatial light modulator 110 shifts the phase of two orthogonal polarization components of the interfering signal.

In a particular implementation, the EME resistant spatial light modulator 110 is configured to modify a transmission strength of one or more modes of two orthogonal modes (e.g., ordinary waves and extraordinary waves) of the interfering signal. For example, the EME resistant spatial light modulator 110 is configured to modify a relation between a first transmission strength of first waves (e.g., the ordinary waves) and a second transmission strength of second waves (e.g., the extraordinary waves) of the interfering signal. The first and second transmission strengths may determine the direction of polarization of the interfering signal. The angle of polarized light of the interfering signal that is transmitted at each point defines a vector of the polarized light. Across the surface of the EME resistant spatial light modulator 110, the variation of the polarization of the light of the interfering signal forms a helical pattern. To illustrate, the light of the interfering signal moves in a circle around the center of the EME resistant spatial light modulator 110 and the polarization of light that is passed by the EME resistant spatial light modulator 110 rotates and goes through one or more complete rotations in one circling of the center of the EME resistant spatial light modulator 110. When the interfering signal impinges on the EME resistant spatial light modulator 110, the interfering signal experiences a helical phase delay, which in turn causes cancellation of light at a center of the interfering signal where the phase is undefined. Cancelling the light at the center of the interfering signal produces an image including a dark spot (representing the canceled light of the interfering signal) surrounded by one or more bright rings, each succeeding ring from the center of the dark spot being dimmer than a previous interior ring.

Additionally, the EME resistant spatial light modulator 110 is configured to receive a reflection signal corresponding to reflected light from the target 106 (and surrounding areas) and to direct the reflection signal (such as reflection signal 362 described below) to the imaging system 130 while modifying the interfering signal. In some implementations, the EME resistant spatial light modulator 110 is configured to move or rotate such that the EME resistant spatial light modulator 110 is substantially aligned with (e.g., perpendicular to or substantially perpendicular to) the interfering signal. Because the reflection signal and the interfering signal do not share the same axis, the EME resistant spatial light modulator 110 may not be aligned with the reflection signal and does not cancel the reflection signal. The EME resistant spatial light modulator 110 may not direct the interfering signal (or a majority thereof) to the imaging system 130.

The optical signal generator 120 is optically coupled to the EME resistant spatial light modulator 110 and is configured to generate and provide the optical signal to the EME resistant spatial light modulator 110 to cause the layer of optically-sensitized carbon nanotubes to form the pattern of conductive nanotubes which modifies the interfering signal to form the optical vortex. The optical signal generator includes an optical source 122, focusing optics 124, a controller 126, and a memory 128.

The optical source 122 is configured to generate light corresponding to the optical signal. For example, the optical source may generate the optical signal or may generate light that is modified or directed (e.g., focused) into the optical signal by one or more other components, such as the focusing optics 124. The optical signal includes regions of different intensity (or phase) light. A first wavelength of the optical signal is different from (e.g., less than) a second wavelength of the interfering signal. As an illustrative, non-limiting example, the first wavelength is less than or equal to 495 nanometers (e.g., blue-light spectrum). In such implementations, the second wavelength of the interfering signal is greater than or equal to 620 nanometers. By using the optical signal having the first wavelength that is smaller than the second wavelength, the interfering signal may not interfere with the operation of the EME resistant spatial light modulator 110. For example, the interfering signal may not activate the layer of optically-sensitized carbon nanotubes and may not interfere with the pattern of conductive nanotubes formed by the optical signal. The optical source 122 may include or correspond to one more light-emitting diodes (LEDs). The one or more or more LEDs may be of the same type or may include multiple types. Because the optical source 122 may include multiple types of LEDs, the first wavelength of the optical signal may be adjusted by selectively activating a single type of LEDs. In a particular implementation, the optical source 122 includes a plurality of blue-light LEDs, as an illustrative, non-limiting example. In other implementations, the optical source 122 includes other color LEDs, ultraviolet light LEDs, or other devices for producing short wavelength light. The optical source 122 is further described with reference to FIG. 3.

The focusing optics 124 are configured to receive the light generated by the optical source 122 and to direct the light to the EME resistant spatial light modulator 110. The focusing optics 124 may be configured to generate the optical signal based on the light generated by the optical source 122. The focusing optics 124 may include one or more stages of light modifying, focusing, or directing elements. Each stage may include different types of elements. The focusing optics 124 may include or correspond to one or more lenses or mirrors, one or more liquid-crystal display (LCD) spatial light modulators, one or more optical fibers, one or more optical filters, or any combination thereof.

In some implementations, the focusing optics 124 utilize folding optics to increase beam length and decrease a size of the reconfigurable optical device 104. Additionally, the focusing optics 124 may utilize beam combining. In such implementations, the optical source 122 includes a plurality of light sources and the focusing optics 124 includes multiple focusing elements. The multiple focusing elements may be configured to focus and direct a portion of the light of the optical signal from a corresponding light source to the EME resistant spatial light modulator 110 where one or more portions of light constructively interfere to form the optical signal. By using beam combining, an intensity of the optical signal may be increased using multiple relatively lower intensity light sources. The focusing optics 124 are further described with reference to FIG. 3.

The controller 126 is configured to determine and adjust the optical signal and the resulting pattern of conductive nanotubes of the EME resistant spatial light modulator 110. For example, the controller 126 retrieves information corresponding to the target 106, the interfering signal source 108, or both, from the memory 128. The controller 126 determines the optical signal (e.g., the pattern caused by the optical signal and/or a wavelength of the optical signal) based on the retrieved information, on sensor data generated by the one or more sensors 140, or both. The controller 126 transmits control signals to the optical source 122, the focusing optics 124, or both, to generate and adjust the optical signal to form the pattern on the EME resistant spatial light modulator 110. The controller 126 may include or correspond to a processor.

The memory 128 is coupled to or accessible by the controller 126. The memory 128 is configured to store wavelength data associated with wavelengths of external interfering signal sources (e.g., the interfering signal source 108), pattern data associated with directions (e.g., angles of incidence) of the external interfering signal sources, beam divergence data associated with beam divergences of the external interfering signal sources, position data associated with positions of the external interfering signal sources, or a combination thereof. For example, the memory 128 may store data structures (e.g., a lookup table) or one or more algorithms used to determine and/or adjust (e.g., update) the pattern. Although, the memory 128 is illustrated as being part of the optical signal generator 120, in other implementations, the memory 128 is separate from the optical signal generator 120.

The imaging system 130 is optically coupled to the EME resistant spatial light modulator 110. In some implementations, the imaging system 130 includes the reconfigurable optical device 104. The imaging system 130 is configured to generate image data based on the reflection signal (e.g., light reflected from the target 106). The imaging system 130 includes one or more image sensors configured to receive the reflection signal and to generate the image data. The imaging system 130 may include or correspond to a camera. In a particular implementation, the imaging system 130 includes or corresponds to a targeting system or a component of a targeting system of the vehicle 102.

The vehicle 102 includes one or more sensors 140, such as a speed sensor, an attitude sensor, an altitude sensor, an accelerometer, a distance sensor (e.g., a rangefinder), a gyroscope, an inertia sensor (e.g., an inertial measurement unit), a radar sensor, etc. The one or more sensors 140 are configured to generate sensor data corresponding to the vehicle 102, the target 106, the interfering signal source 108, or a combination thereof. The sensor data may include speed data, altitude data, acceleration data, distance data, position data, heading data, or a combination thereof. To illustrate, a pitot static tube may generate speed data indicating a speed of the vehicle 102 and a radar sensor may generate velocity data indicating a movement speed and a direction of the interfering signal source 108. As another example, a rangefinder may generate distance data indicating a distance between the vehicle and the interfering signal source.

The sensor data may be sent to the controller 126, stored at the memory 128, or a combination thereof. In some implementations, the sensor data indicates a distance and/or a direction from the vehicle 102 (e.g., the reconfigurable optical device 104 of the vehicle 102) to the target 106, the interfering signal source 108, or both. Alternatively, the distance and/or direction (indicative of an angle of incidence of the interfering signal relative to the EME resistant spatial light modulator) is determinable from the sensor data. For example, the controller 126 may process multiple different types of sensor data to determine the distance and/or the direction or to predict the distance and/or the direction at a future time. To illustrate, the controller 126 may process acceleration data and heading data to determine a predicted position of the vehicle 102, the target 106, the interfering signal source 108, or a combination thereof. The controller 126 may use the predicted position(s) to determine a predicted distance and a predicted direction. In some implementations, the controller 126 may spatially adjust the optical signal (e.g., adjust or skew the pattern of conductive nanotubes generated by the optical signal) based on the predicted distance and/or the predicted direction.

Additionally or alternatively, the controller 126 adjusts a wavelength of the optical signal (e.g., adjust or select one or more types of carbon nanotubes of multiple different types of carbon nanotubes that are activated by the optical signal) based on a wavelength of the interfering signal. The controller 126 may be configured to adjust the pattern (e.g., iteratively adjust the pattern) in response to determining that a quality of an image output by the imaging system 130 is below a threshold.

The target 106 includes or corresponds to a target to be imaged by the imaging system 130. The target 106 may be stationary or moving. The interfering signal source 108 includes or corresponds to a laser weapon, a laser targeting system, or another high-intensity light source. The interfering signal source 108 may be a component of the target 106 or may be separate from the target 106. In some implementations, the interfering signal source 108 is proximate to the target 106.

During operation, a component of the vehicle 102 identifies the target 106. For example, the one or more sensors 140 may identify the target 106, the target 106 may be received via user input, or the target 106 may be designated by an external source via wireless communication. In a particular implementation, the controller 126 receives information designating or identifying the target 106 via user input. Responsive to receiving the information, the controller 126 initiates a search of potential sources of interfering signals associated with the target 106. For example, the controller 126 may search the memory 128, monitor the EME resistant spatial light modulator 110, generate a search request that is sent to an external database, or a combination thereof, to identify the potential sources. If the controller 126 identifies the interfering signal source 108 as the source of the interfering signal, the controller 126 retrieves a pattern and/or a wavelength of the optical signal that corresponds to the interfering signal source 108 from the memory 128, or the controller 126 determines (e.g., calculates) the pattern based on data corresponding to the interfering signal source 108 stored in the memory 128. The data corresponding to the interfering signal source 108 may include information about the position of the interfering signal source 108 relative to the vehicle 102 and characteristics of the interfering signal source 108, such as a laser type or a wavelength of the interfering signal, as illustrative, non-limiting examples.

Additionally or alternatively, the controller 126 may be configured to determine (e.g., retrieve or calculate) the pattern and/or the wavelength of the optical signal based on information received from an external source. If the controller 126 does not identify the interfering signal source 108 from the memory 128 or the external source, the controller 126 may generate the optical signal based on a default pattern and wavelength or based on a pattern and wavelength determined based on previously received interfering signals. Alternatively, the controller 126 may generate the optical signal responsive to receiving an interfering signal. For example, the controller 126 may generate the optical signal after determining one or more characteristics of the interfering signal, such as a wavelength, a beam divergence, a beam size, a direction, or a combination thereof.

In a particular implementation, the controller 126 determines the pattern based on a direction of the interfering signal. As an illustrative example, the direction of the interfering signal may be determined based on a position of the interfering signal source 108 relative to the vehicle 102. The direction of the interfering signal may correspond to an angle of incidence of the interfering signal relative to the surface of the EME resistant spatial light modulator 110. The pattern may include or correspond to multiple concentric circles, spirals, or a fork. In implementations where the pattern corresponds to a spiral, an eccentricity of the spiral is based on the direction of the source of the interfering signal. An order of the spiral is based on a divergence of the interfering signal. The order of the spiral denotes a number of times the EME resistant spatial light modulator 110 produces a wavelength shift (e.g., a 360 degree phase change) of the interfering signal along a path traced once around a center of the EME resistant spatial light modulator 110.

The wavelength of the interfering signal may be used to determine which type of sensitized carbon nanotubes in the EME resistant spatial light modulator 110 to activate. Different types of carbon nanotubes may be selected by adjusting a wavelength of the optical signal or adjusting a placement of the optical signal with respect to the EME resistant spatial light modulator 110. For example, different types of carbon nanotubes may be selected by applying the optical signal to a specific side of the EME resistant spatial light modulator 110, as described with reference to FIG. 4.

The controller 126 causes the optical signal generator 120 to project an optical signal that causes the EME resistant spatial light modulator 110 to form the pattern of conductive nanotubes. For example, the controller 126 sends control signals to the optical source 122, the focusing optics, or a combination thereof, to generate and direct the optical signal to the EME resistant spatial light modulator 110.

Figure 2A:
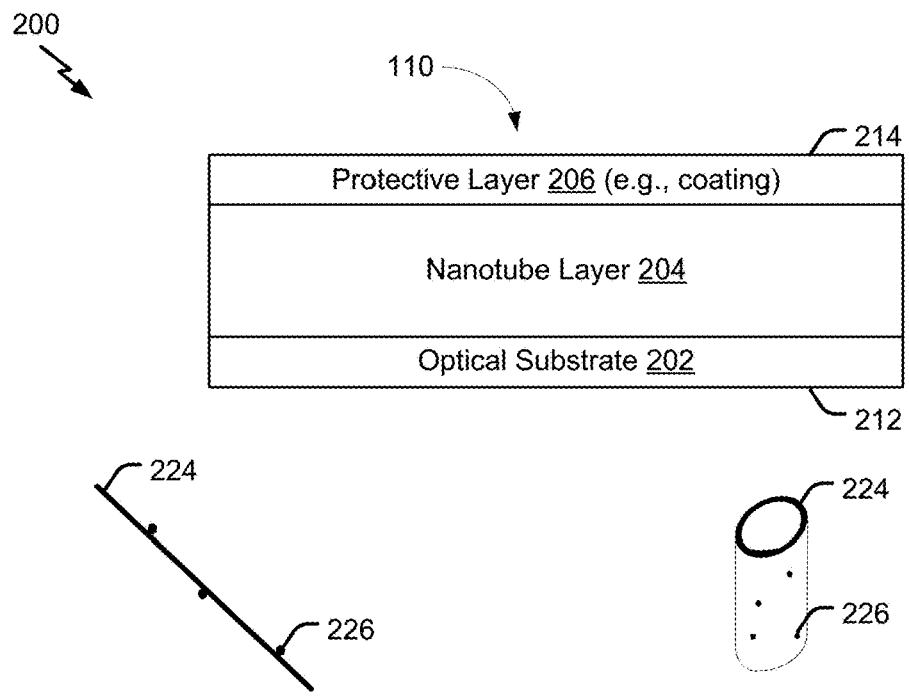
FIG. 2A is a diagram that illustrates an illustrative configuration of an electromagnetic effect (EME) resistant spatial light modulator.

The optical signal causes portions or regions of the EME resistant spatial light modulator 110 to transition from semiconductive to conductive, as described further with reference to FIG. 2A. The conductive portions or regions form the pattern and disrupt the interfering signal. For example, the pattern may reduce an intensity of the interfering signal and cause destructive interference. The EME resistant spatial light modulator 110 receives the reflection signal from the target 106 and directs the reflection signal to the imaging system 130. The EME resistant spatial light modulator 110 may not direct a majority of the interfering signal to the imaging system 130. The imaging system 130 is able to capture images of the target 106 while the interfering signal is being directed at the EME resistant spatial light modulator 110.

While in operation, the vehicle 102, the target 106, the interfering signal source 108, the EME resistant spatial light modulator 110, or a combination thereof, may move relative to one another. The controller 126 adjusts the optical signal to account for movement of the vehicle 102, the target 106, the interfering signal source 108, the EME resistant spatial light modulator 110, or a combination thereof. For example, when the vehicle 102 is moving relative to the interfering signal source 108, the controller 126 may adjust the optical signal based on the sensor data from a speed sensor (e.g., an air speed sensor), an attitude sensor, an altitude sensor, an accelerometer, a gyroscope, an inertia sensor (e.g., an inertial measurement unit), a radar sensor, or a combination thereof, of the one or more sensors 140. To illustrate, the controller 126 adjusts the control signals to adjust or update the optical signal and the resulting pattern of conducive nanotubes. As an angle between the vehicle 102 and the interfering signal source 108 changes, the controller 126 may adjust the optical signal to update the position of the pattern on the EME resistant spatial light modulator 110 to track the interfering signal. For example, the controller 126 may skew the pattern to account for changes in an angle between the vehicle 102 and the interfering signal source 108. To illustrate, the controller 126 may adjust the eccentricity of the pattern. As another example, the controller 126 may shift a center of the pattern to account for changes in a position of where the interfering signal impinges on the EME resistant spatial light modulator 110. Additionally, the controller 126 may adjust the optical signal to account for changes in a wavelength of the interfering signal. For example, the controller 126 may adjust which type of optically-sensitized carbon nanotubes to activate (e.g., switch from semiconducting to conducting) to account for changes in the wavelength of the interfering signal.

In some implementations, the optical signal is further configured to generate the pattern such that the pattern causes generation of a second optical vortex. The second optical vortex may be used to modify a second interfering signal from another interfering signal source (not shown) to form the second optical vortex. The other interfering signal source may correspond to a second laser weapon or a second laser targeting system. The second interfering signal may have a wavelength that is the same as or different from the second wavelength of the interfering signal. The second optical vortex may be generated concurrently with the optical vortex.

Because the EME resistant spatial light modulator 110 is optically controlled (instead of electrically controlled), the EME resistant spatial light modulator 110 is substantially resistant to EME. Accordingly, the EME resistant spatial light modulator 110 may be used with the imaging system 130 to capture images of the target 106 near the interfering signal source 108. As compared to mechanical spatial light modulators, the EME resistant spatial light modulator 110 is reconfigurable. Additionally, because the EME resistant spatial light modulator 110 is optically controlled, the EME resistant spatial light modulator 110 may be smaller and lighter (e.g., may include fewer mechanical components, such as actuators) than mechanical spatial light modulators. Furthermore, the EME resistant spatial light modulator 110 may be adjusted for movement (of the target 106 or the vehicle 102) faster than mechanical spatial light modulators. Accordingly, the EME resistant spatial light modulator 110 may be used on board moving objects, such as aircraft, and may be used to image other moving objects.

Figure 2B:
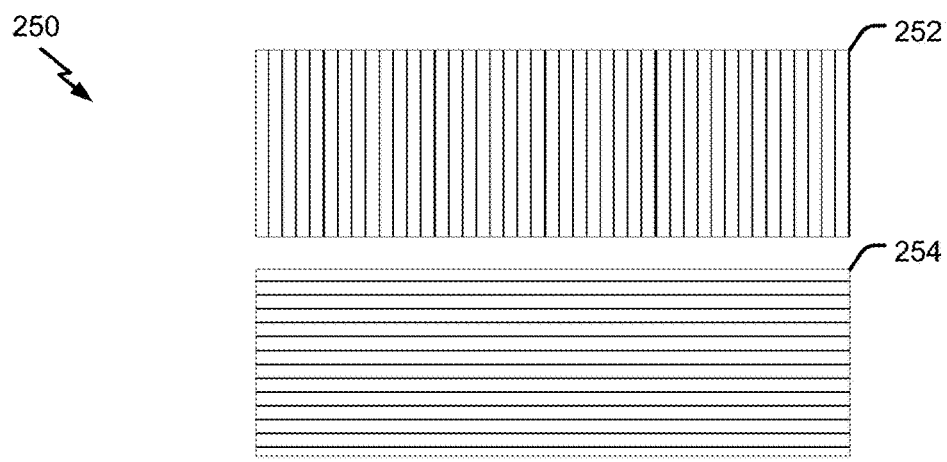
FIG. 2B is a diagram that illustrates an example of a configuration of a composite layer of an EME resistant spatial light modulator.

FIG. 2A illustrates a diagram 200 of an example configuration of the EME resistant spatial light modulator 110 and FIG. 2B illustrates a diagram 250 of an example configuration of a composite layer 256 of layers of optically-sensitized carbon nanotubes 252, 254. As illustrated in the diagram 200 of FIG. 2A, the EME resistant spatial light modulator 110 includes an optical substrate 202, a layer of optically-sensitized carbon nanotubes 204, and a protective layer 206. In some implementations, the layer of optically-sensitized carbon nanotubes 204 may include or correspond a composite layer, such as the composite layer 256 of FIG. 2B.

The optical substrate 202 provides support for the layer of optically-sensitized carbon nanotubes 204. The optical substrate 202 is fabricated from an optically transparent material that enables light (e.g., the optical signal) to pass through to the layer of optically-sensitized carbon nanotubes 204. The optical substrate 202 may have a low refraction index for a wavelength or wavelengths of the optical signal to enable more light (e.g. a majority of the optical signal) to pass through the optical substrate 202 and to enable the light to pass through the optical substrate 202 substantially unmodified (e.g., cause a relatively low change in incidence angle of the light). The optical substrate 202 corresponds to a first side 212 of the EME resistant spatial light modulator 110. The optical substrate 202 may include optical anti-reflection coatings.

The layer of optically-sensitized carbon nanotubes 204 is positioned between the optical substrate 202 and the protective layer 206. The layer of optically-sensitized carbon nanotubes 204 is configured to react to the optical signal to form a pattern of conductive nanotubes. In a particular implementation, the layer of optically-sensitized carbon nanotubes 204 is configured to react to light (e.g., the optical signal) having wavelengths in a particular range, and thus form the pattern. The layer of optically-sensitized carbon nanotubes 204 does not react to light (e.g., the interfering signal) having wavelengths outside of (e.g., greater than) the particular range. Thus, in the particular implementation, the optical source 122 is configured to generate light of the optical signal that is within the particular range of wavelengths that cause the optically-sensitized carbon nanotubes 224 to react, whereas the interfering signal source 108 is configured to generate light that is not within the particular range of wavelengths that cause the optically-sensitized carbon nanotubes 224 to react.

In some implementations, the layer of optically-sensitized carbon nanotubes 204 includes single-walled carbon nanotubes. In such implementations, the single-walled carbon nanotubes may have a chiral configuration or a rolling angle that is associated with semiconductive carbon nanotubes. The structure of a single-walled carbon nanotube can be conceptualized by rolling a one-atom-thick layer of graphite (e.g., graphene) into a cylinder forming a honeycomb lattice. The rolling angle of the layer is represented by a pair of indices (N, M). The integers N and M denote the number of unit vectors along two directions of the rolling angle in the honeycomb lattice of the graphite. In implementations where M does not equal zero or N, the single-walled carbon nanotube is asymmetrical, which may be referred to as having a chiral configuration.

Alternatively, the single-walled carbon nanotubes may have an armchair or zig-zag configuration. Additionally, the layer of optically-sensitized carbon nanotubes 204 may include multiple types of carbon nanotubes. For example, the layer of optically-sensitized carbon nanotubes 204 may include first nanotubes having a first length and second nanotubes having a second length different from the first length. Additionally or alternatively, the first nanotubes have a first diameter and the second nanotubes have a second diameter that is different from the first diameter.

Each carbon nanotube includes light absorbing elements, such as one or more quantum dots 226. An illustrative example of an optically-sensitized carbon nanotube 224 is depicted in FIG. 2A. The optically-sensitized carbon nanotube 224 includes a plurality of the quantum dots 226. Each of the one or more quantum dots 226 is configured to absorb light (e.g., the optical signal) having a wavelength in a particular range to generate a charge (e.g., a photo-voltage). The charge causes the optically-sensitized carbon nanotube to transition from the semiconductive state to the conductive state (e.g., a metallic state). The one or more quantum dots 226 include a photosensitive material, a semiconductive material, or both. For example, the one or more quantum dots 226 may include a photosensitive polymer, peptides, or a heavy metal compound (e.g., cadmium sulfide (CdS), cadmium selenide (CdSe), indium phosphide (InP), zinc sulfide (ZnS), etc.), as illustrative, non-limiting examples.

Each quantum dot has a charge retention time. The charge retention time is a measure of how long a quantum dot holds a charge after interacting with a photon. As an illustrative, non-limiting example, the quantum dots 226 may have charge retention times of microseconds. Charge retention time is based on the materials of the quantum dot, a size of the quantum dot, and an internal structure of the quantum dot. These parameters can be adjusted to set the controlling wavelength and charge retention time of a quantum dot. The shorter the charge retention time, the more quickly the pattern can be changed and the EME resistant spatial light modulator 110 can be refreshed to account for changes of the incoming laser beam. When the charge fades, the optically-sensitized carbon nanotube transitions from the conductive state to the semiconductive state. In other implementations, the light absorbing elements include photosensitive molecules. The photosensitive molecules are configured to absorb light (e.g., the optical signal) having a wavelength in a particular range to generate a charge (e.g., a photo-voltage) that causes the optically-sensitized carbon nanotube 224 to transition from the semiconductive state to the conductive state (e.g., a metallic state).

In some implementations, nanotubes of the layer of optically-sensitized carbon nanotubes 204 are randomly aligned or are unaligned. As carbon nanotubes are conductive along a primary axis (e.g., lengthwise), unaligned carbon nanotubes of the layer of optically-sensitized carbon nanotubes 204 may cause the layer of optically-sensitized carbon nanotubes 204 to disperse a charge in all directions.

In other implementations, the nanotubes of the layer of optically-sensitized carbon nanotubes 204 are aligned along one or more directions. For example, the nanotubes of the layer of optically-sensitized carbon nanotubes 204 may be aligned lengthwise in a first direction. As another example, a first portion of the optically-sensitized nanotubes 224 of the layer of optically-sensitized carbon nanotubes 204 may be aligned lengthwise in a first direction, and a second portion of the optically-sensitized carbon nanotubes 224 of the layer of optically-sensitized carbon nanotubes 204 may be aligned lengthwise in a second direction that is different from (e.g., orthogonal to) the first direction.

The protective layer 206 corresponds to a second side 214 of the EME resistant spatial light modulator 110. The protective layer 206 (e.g., a coating) is configured to provide protection for the layer of optically-sensitized carbon nanotubes 204. For example, the protective layer 206 protects individual nanotubes from being dislodged from the layer of optically-sensitized carbon nanotubes 204. Additionally, the protective layer 206 acts as a barrier to the environment to limit contact with particles or pollutants that interfere with the function of the layer of optically-sensitized carbon nanotubes 204. Similar to the optical substrate 202, the protective layer 206 is also optically transparent such that light passes through to the layer of optically-sensitized carbon nanotubes 204 substantially unmodified. Accordingly, the EME resistant spatial light modulator 110 is configured such that the EME resistant spatial light modulator 110 may be optically controlled (e.g., receive optical signals) from the first side 212, the second side 214, or both, as described with reference to FIGS. 3 and 4.

The protective layer 206 may be designed based on the environment in which the EME resistant spatial light modulator 110 is to operate. Accordingly, the protective layer 206 may include one or more hard coatings, one or more optical anti-reflection coatings, or a combination thereof, based on the operating environment. Although, the EME resistant spatial light modulator 110 is illustrated as having three layers (e.g., 202, 204, and 206), the EME resistant spatial light modulator 110 may include additional layers.

Referring to the diagram 200, the layer of optically-sensitized carbon nanotubes 204 may include multiple layers of nanotubes and one or more of the layers of nanotubes may include multiple types of nanotubes. For example, each layer of nanotubes may include nanotubes of a single type. As another example, a first layer of nanotubes may include a first type and a second type of nanotubes, and a second layer of nanotubes may include a third type of nanotubes. The multiple layers of nanotubes may be used to adjust a phase of interfering signals, as described further herein. Having multiple different types of nanotubes in one or more layers increases the ability of the EME resistant spatial light modulator 110 to manipulate a broad range of wavelengths of incoming interfering signal. While carbon nanotubes have a relatively high conductivity in the conductive state, increasing the length and the diameter of the carbon nanotubes may increase conductivity of the carbon nanotubes to a particular wavelength of light. Thus, a layer of carbon nanotubes including multiple types of carbon nanotubes (or a device with multiple layers of different types of carbon nanotubes) has increased conductivity for a broader spectrum of wavelengths of incoming light.

Referring to 2B, an illustrative, non-limiting example of fabrication of the layer of optically-sensitized carbon nanotubes 204 of the EME resistant spatial light modulator 110 is illustrated. A solution of carbon nanotubes is divided into two solutions and the carbon nanotubes of the first solution are optically sensitized, such as by adding the quantum dots 226. The quantum dots 226 respond to a particular wavelength or wavelength range of light. The carbon nanotubes of the first solution are optically-sensitized by forming or depositing one or more quantum dots 226 (e.g., a first type of the quantum dots 226) on the carbon nanotubes. The quantum dots 226 are physically or chemically attached to the carbon nanotubes. The carbon nanotubes of the second solution are optically sensitized to respond to a different wavelength or wavelength range. The optically-sensitized carbon nanotubes 224 of the second solution may have the quantum dots 226 (e.g., the first type of the quantum dots 226 or a second type of the quantum dots 226) deposited or formed on the carbon nanotubes. In some implementations, the optically-sensitized carbon nanotubes 224 of the first solution and the second solution have substantially the same chirality and/or substantially the same chiral angle, such that the optically-sensitized carbon nanotubes 224 of both solutions are either conductive or semiconductive.

After the carbon nanotubes are optically-sensitized, a first portion (e.g., the first solution) of the optically-sensitized carbon nanotubes are aligned in a first direction and a second portion (e.g., the second solution) of the optically-sensitized carbon nanotubes are aligned in a second direction. To illustrate, the portions of optically-sensitized carbon nanotubes may be aligned by an electric field or a magnetic field. For example, a first layer of optically-sensitized carbon nanotubes 252 includes nanotubes aligned vertically as illustrated in FIG. 2B and a second layer of optically-sensitized carbon nanotubes 254 includes nanotubes aligned horizontally as illustrated in FIG. 2B. As illustrated in the diagram 250, the first direction is orthogonal to the second direction. The portions of aligned optically-sensitized carbon nanotubes may be cured into sheets or layers.

The first layer of optically-sensitized carbon nanotubes 252 and the second layer of optically-sensitized carbon nanotubes 254 are joined together to form a composite layer 256. For example, the two layers of optically-sensitized carbon nanotubes 252, 254 may be pressed together after curing. When joined, carbon nanotubes of the composite layer 256 may form a grid like structure. The grid like structure defines a plurality of optically activatable regions which are responsive to the optical signal. Each space or grid defined by the grid like structure corresponds to an optically activatable region, such as an optically activatable region 282. Because the carbon nanotubes are oriented in different directions and are designed to respond to different wavelengths, the electrical state (conductive or semiconductive) of the carbon nanotubes in different orientations are independently controllable. Accordingly, an intensity and an angle of the birefringence of the combined nanotube layer can be controlled. The optical signal activates multiple activatable regions to form the pattern of conductive and semiconductive nanotubes. The multiple activated regions of the pattern cause amplitude and phase shifts in the incoming light (e.g., the interfering signal). The amplitude and phase shifts cause the incoming light to form an optical vortex and cause destructive interference.

Figure 2B:
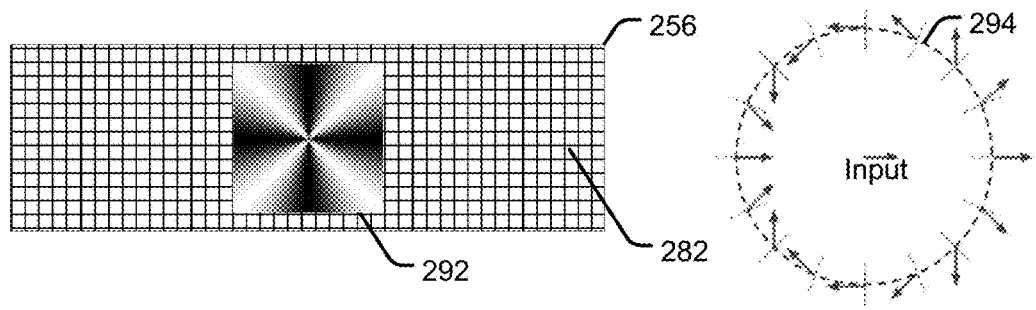

An illustrative representation of multiple activated regions of an exemplary pattern 292 of conductive nanotubes is illustrated in FIG. 2B. An exemplary polarization pattern 294 of the pattern 292 is illustrated in FIG. 2B and arrows of the polarization pattern 294 represent vectors of the polarization of the light of the interfering signal. At each different point around the circle of the polarization pattern 294, the pattern 292 of conductive nanotubes allows the passage (e.g., transmission or reflection) of the light of the interfering signal having an electric field that corresponds to a direction of a corresponding arrow at each point. The arrows of the polarization pattern 294 illustrate the direction of the electric field vector of the passed light of the interfering signal. The directions of the arrows form a circular pattern which causes the polarization of the passed light of the interfering signal to spiral as it passes the composite layer 256 of optically-sensitized carbon nanotubes. The pattern 292 of conductive nanotubes illustrates an output of the passed light of the interfering signal that has an electric field aligned vertically as in FIG. 2. The white regions of the pattern 292 illustrate the angles at which the passed light of the interfering signal has the vertically oriented electric field.

An alternative, non-limiting example of fabrication of the layer of optically-sensitized carbon nanotubes 204 of the EME resistant spatial light modulator 110 includes producing a first solution of carbon nanotubes in which the carbon nanotubes have substantially the same chirality and/or substantially the same chiral angle, such that all of the carbon nanotubes are either conductive or semiconductive. The fabrication also includes producing a second solution of carbon nanotubes that have the opposite electrical state of the carbon nanotubes of the first solution. For example, in implementations where the carbon nanotubes in the first solution are conductive, the carbon nanotubes in the second solution are designed to be semiconductive. The carbon nanotubes of both solutions are optically sensitized, such as by the addition of the quantum dots 226 to the carbon nanotubes, to respond to a particular wavelength (or wavelength range) of light. The carbon nanotubes are optically-sensitized by forming or depositing one or more of the quantum dots 226 on the carbon nanotubes. The quantum dots 226 are physically or chemically attached to the carbon nanotubes.

After the carbon nanotubes are optically-sensitized, the first portion (e.g., the first solution) of the optically-sensitized carbon nanotubes are aligned in a first direction and the second portion (e.g., the second solution) of the optically-sensitized carbon nanotubes are aligned in a second direction. To illustrate, the portions of optically-sensitized carbon nanotubes may be aligned by an electric field or a magnetic field. For example, a first layer of optically-sensitized carbon nanotubes 252 includes carbon nanotubes aligned vertically, as illustrated in FIG. 2B, and a second layer of optically-sensitized carbon nanotubes 254 includes carbon nanotubes aligned horizontally, as illustrated in FIG. 2B. As illustrated in the diagram 250, the first direction is orthogonal to the second direction. The portions of aligned optically-sensitized carbon nanotubes may be cured into sheets or layers.

The first layer of optically-sensitized carbon nanotubes 252 and the second layer of optically-sensitized carbon nanotubes 254 are joined together to form a composite layer 256. For example, the two layers of optically-sensitized carbon nanotubes 252, 254 may be pressed together after curing. When joined, carbon nanotubes of the composite layer 256 may form a grid like structure. The grid like structure defines a plurality of optically activatable regions which are responsive to the optical signal. Because the carbon nanotubes are oriented in different directions, designed to respond to the same wavelength, and have opposite electrical starting states, the optical signal activates the carbon nanotubes oriented in the first direction (or the second direction) to the same electrical state as the carbon nanotubes oriented in the second direction. Accordingly, the intensity and the angle of the birefringence of the combined nanotube layer can be controlled. The optical signal activates multiple activatable regions to form the pattern of conductive and semiconductive nanotubes. The multiple activated regions of the pattern cause amplitude and phase shifts in the incoming light (e.g., the interfering signal). The amplitude and phase shifts cause the incoming light to form a vortex and cause destructive interference. An illustrative representation of multiple activated regions of an exemplary pattern 292 of conductive nanotubes is illustrated in FIG. 2B.

The EME resistant spatial light modulator 110 may be fabricated by forming the optical substrate 202 and joining the optical substrate 202 and the layer of optically-sensitized carbon nanotubes 204 (e.g., the composite layer 256) together. For example, the optical substrate 202 may be formed on the layer of optically-sensitized carbon nanotubes 204 or the layer of optically-sensitized carbon nanotubes 204 may be placed or formed on the optical substrate 202 after forming the optical substrate 202. The protective layer 206 is deposited on the layer of optically-sensitized carbon nanotubes 204 to form the EME resistant spatial light modulator 110, before or after the layer of optically-sensitized carbon nanotubes 204 is joined with the optical substrate 202.

By using carbon nanotubes, the EME resistant spatial light modulator 110 may be resistant or substantially immune to EME. To illustrate, carbon nanotubes have a very high resistance to switching between conductive and non-conductive states when large electrical fields are applied. Thus, carbon nanotube based spatial light modulators may be non-reactive to large electrical fields generated by incoming light (e.g., the interfering signal) and/or other high power electromagnetic radiation sources, such as a microwave weapon attacking in conjunction with the interfering signal. Accordingly, the pattern of conductive nanotubes may not be disrupted or deformed by the large electrical fields generated by the incoming light or a second electromagnetic weapon. Because the pattern is not disrupted by the large electrical field, the EME resistant spatial light modulator 110 can still modify incoming light into optical vortices while experiencing the large electrical fields generated by the incoming light. Additionally, because the EME resistant spatial light modulator 110 is controlled optically, control signals (e.g., the optical signal) used to form the pattern may not be affected by the large electrical fields generated by the incoming light even when the incoming light has a higher intensity than the control signals.

Figure 3:
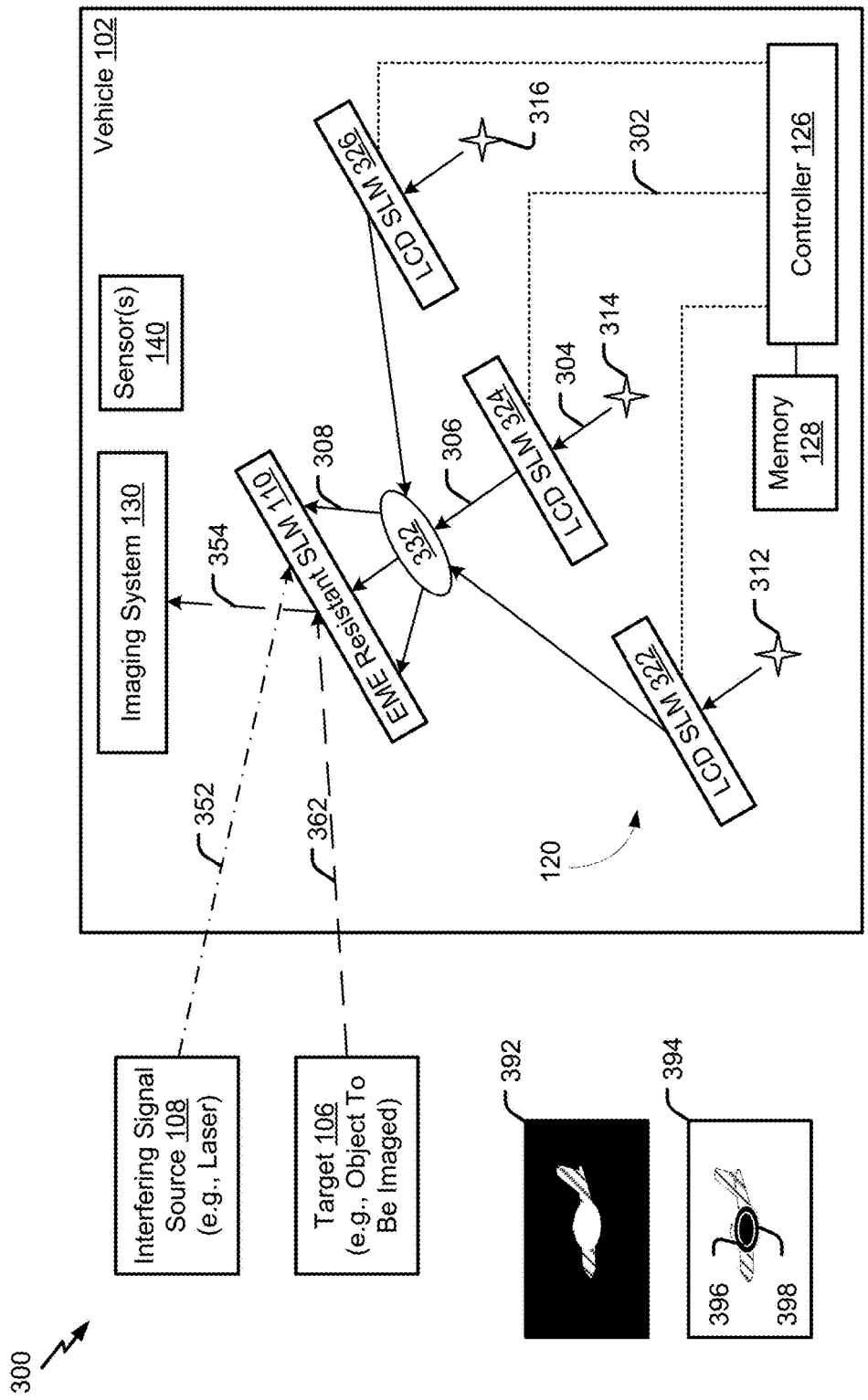
FIG. 3 is a diagram that illustrates an example of a configuration of an optical signal generator.

FIG. 3 illustrates a diagram 300 of the vehicle 102 including an example configuration of the optical signal generator 120 of FIG. 1. As illustrated in FIG. 3, the optical signal generator 120 includes the optical source 122 which in the illustrated configuration is implemented as a plurality of LEDs 312, 314, 316. The optical signal generator 120 also includes the focusing optics 124 which in the illustrated configuration are implemented as Liquid Crystal Display (LCD) spatial light modulators 322, 324, 326 and a focusing optic 332. The optical signal generator 120 further includes the controller 126 and the memory 128.

The plurality of LEDs 312, 314, 316 are configured to generate a light signal 304 (e.g., unmodified light). Each plurality of LEDs 312, 314, 316 generates a portion of the light signal 304. In some implementations, the plurality of LEDs 312, 314, 316 include multiple LEDs of the same type. As illustrative, non-limiting examples, the types of LEDs include blue-light LEDs, ultraviolet light LEDs, white light LEDs, etc. In such implementations, the plurality of LEDs 312, 314, 316 may generate the light signal 304 such that the light signal 304 has a wavelength in a relatively narrow wavelength range, such as a blue-light wavelength range (e.g., approximately 400 nanometers to 495 nanometers) or an ultraviolet light wavelength range (e.g., approximately 10 nanometers to 400 nanometers). Alternatively, the plurality of LEDs 312, 314, 316 may generate the light signal 304 such that the light signal 304 has wavelengths in a relatively broad wavelength range. To illustrate, the first plurality of LEDs 312 may include white-light LEDs that generate the light signal 304 (e.g., white light) having wavelengths in multiple light spectrums or in multiple wavelength ranges of the visible light spectrum.

In other implementations, the plurality of LEDs 312, 314, 316 include LEDs of multiple different types. To illustrate, the first plurality of LEDs 312 may include one or more blue-light LEDs and one or more red-light LEDs. In such implementations, the controller 126 may select which type or types of LEDs to activate to generate the light signal 304. When multiple types of LEDs are used, the light signal 304 may have wavelengths in multiple light spectrums or in multiple wavelength ranges of the visible light spectrum. Alternatively, other short wavelength light generating sources may be used, such as halogen lights or blue lasers.

Each of the LCD spatial light modulators 322, 324, 326 is configured to receive a portion of the light signal 304 from a corresponding plurality of LEDs and is configured to modify the received portion of the light signal 304 to generate a portion of a modified light signal 306 based on one or more control signals 302. The LCD spatial light modulators 322, 324, 326 may modulate (e.g., spatially modulate) a phase, an intensity, or both, of the received portion of the light signal 304 to generate a corresponding portion of the modified light signal 306 (e.g., three portions as illustrated in FIG. 3). As an illustrative, non-limiting example, modulating the phase, the intensity, or both, of the received light signal 304 may include generating (or reproducing) the modified light signal 306 based on the one or more control signals 302 and measuring the phase and the intensity of the received light signal 304 at a plurality of points of each of the LCD spatial light modulators 322, 324, 326. Alternatively, a first region a particular LCD spatial light modulator may block light corresponding to a first region of the light signal 304 and a second region of the particular LCD spatial light modulator may allow light of the received light signal 304 corresponding to a second region of the light signal 304 to pass through the particular LCD spatial light modulator substantially unmodified based on the one or more control signals 302. The LCD spatial light modulators 322, 324, 326 are configured to provide or direct the modified light signal 306 to the focusing optic 332.

The focusing optic 332 is configured to receive the modified light signal 306 (e.g., a portion of the modified light signal 306 from each of the LCD spatial light modulators 322, 324, 326) and is configured to direct (e.g., focus) the modified light signal 306 to the EME resistant spatial light modulator 110 to generate the optical signal 308. The optical signal 308 causes the EME resistant spatial light modulator 110 to form the pattern of conductive nanotubes. In some implementations, the optical signal 308 and one or more other optical signals may cause the EME resistant spatial light modulator 110 to form the pattern of conductive nanotubes, as described with reference to FIG. 4.

In other implementations, the optical signal generator 120 includes an array of LEDs instead of the one or more LCD spatial light modulators 322, 324, 326. For example, the optical signal generator 120 may include a two-dimensional array of LEDs in which each LED of the array is individually controllable. Light from each of the LEDs of the array is directed to a corresponding location on the EME resistant spatial light modulator 110 by the focusing optic 124, one or more optics (e.g. lenses or mirrors), fiber optics, or a combination thereof. By using fiber optics, the two-dimensional array of LEDs may be located in an electromagnetically shielded location (e.g., within or behind a Faraday shield), while the fiber optics penetrate the Faraday shield and direct light (e.g., the optical signal) from the two-dimensional array of LEDs to a second location containing the EME resistant spatial light modulator 110.

During operation, the controller 126 receives information designating or identifying the target 106. In a particular implementation, the one or more sensors 140 provide sensor data to the controller 126. Responsive to receiving the information, the controller 126 initiates a search of potential sources of an interfering signal 352 associated with the target 106. For example, the controller 126 may search the memory 128, monitor the EME resistant spatial light modulator 110, generate a search request that is sent to an external database, or a combination thereof, to identify the potential sources. If the controller 126 identifies the interfering signal source 108 as the source of the interfering signal 352, the controller 126 retrieves a pattern that corresponds to the interfering signal source 108 (or the interfering signal produced therefrom) from the memory 128. The controller 126 generates and directs the optical signal 308 to the EME resistant spatial light modulator 110 to activate one or more sets (e.g., types) of nanotubes to form the pattern. The one or more sets of nanotubes of the EME resistant spatial light modulator 110 may be of the same layer or of different layers, as described with reference to FIGS. 2A and 2B. The pattern is configured to manipulate light of the wavelengths of the interfering signal 352 produced by the interfering signal source 108. The pattern may be retrieved based on a direction of the source of the interfering signal 352. Additionally or alternatively, the controller 126 determines (e.g., calculates) the pattern and selects one or more sets (e.g., types) of nanotubes to activate based on data corresponding to the interfering signal source 108 stored in the memory 128. The data corresponding to the interfering signal source 108 may include information about characteristics of the interfering signal 352 of the interfering signal source 108, such as a laser type or a wavelength, as illustrative, non-limiting examples. Additionally or alternatively, the controller 126 may be configured to determine (e.g., retrieve or calculate) the pattern based information received from an external source.

The controller 126 causes the optical signal generator 120 to project the optical signal 308 that causes the EME resistant spatial light modulator 110 to form the pattern of the selected set of sensitized nanotubes. For example, the plurality of LEDs 312, 314, 316 generate portions of the light signal 304 and direct the portions of the light signal 304 to a corresponding LCD spatial light modulator of the LCD spatial light modulators 322, 324, 326. To illustrate, a first plurality of LEDs 312 directs a first portion of the light signal 304 to a first LCD spatial light modulator 322.

The controller 126 sends one or more control signals 302 to the LCD spatial light modulators 322, 324, 326 to control and adjust the LCD spatial light modulators 322, 324, 326. Responsive to receiving the one or more control signals 302, the LCD spatial light modulators 322, 324, 326 modify the light signal 304 to generate the modified light signal 306. For example, the LCD spatial light modulators 322, 324, 326 may modulate a phase, an intensity, or both, of the light signal 304 to generate the modified light signal 306. As illustrated in FIG. 3, the first LCD spatial light modulator 322 modifies the first portion of the light signal 304 from the first plurality of LEDs 312 to generate a first portion of the modified light signal 306. A second LCD spatial light modulator 324 modifies a second portion of the light signal 304 from a second plurality of LEDs 314 to generate a second portion of the modified light signal 306, and a third LCD spatial light modulator 326 modifies a third portion of the light signal 304 from a third plurality of LEDs 316 to generate a third portion of the modified light signal 306. In a particular implementation, the light signal 304 includes blue light and the plurality of LEDs 312, 314, 316 correspond to blue-light LEDs.

The LCD spatial light modulators 322, 324, 326 direct the modified light signal 306 to the focusing optic 332 (e.g., a lens or multiple lenses). The focusing optic 332 receives the modified light signal 306 and directs (e.g., focuses) the modified light signal 306 to the EME resistant spatial light modulator 110 to generate optical signal 308. The optical signal 308 corresponds to the optical signal, and the optical signal 308 may include or correspond to the pattern. The optical signal 308 causes portions of the EME resistant spatial light modulator 110 to transition from semiconductive to conductive, as described with reference to FIGS. 1 and 2. The conductive portions form the pattern and disrupt the interfering signal 352. For example, the pattern reduces an intensity of the interfering signal 352 and causes destructive interference. The EME resistant spatial light modulator 110 receives a reflection signal 362 (e.g., reflected light) from the target 106 and directs the reflection signal 362 to the imaging system 130. The EME resistant spatial light modulator 110 reduces an intensity of the interfering signal 352 directed to the imaging system 130. The imaging system 130 may capture images of the target 106 while the interfering signal 352 is being directed at the EME resistant spatial light modulator 110.

While in operation, the vehicle 102, the target 106, the interfering signal source 108, the EME resistant spatial light modulator 110, or a combination thereof, may move relative to one another. The controller 126 adjusts the optical signal to account for movement of the vehicle 102, the target 106, the interfering signal source 108, the EME resistant spatial light modulator 110, or a combination thereof. For example, when the vehicle 102 is moving relative to the interfering signal source 108, the controller 126 may adjust the optical signal based on the sensor data from a speed sensor (e.g., an air speed sensor), an attitude sensor, an altitude sensor, an accelerometer, a gyroscope, an inertia sensor (e.g., an inertial measurement unit), a radar sensor, or a combination thereof, of the one or more sensors 140. To illustrate, the controller 126 may adjust the one or more control signals 302 to adjust or update the optical signal 308 and the pattern. As an angle between the vehicle 102 and the interfering signal source 108 changes, the controller 126 may adjust the optical signal 308 to update the position of the pattern on the EME resistant spatial light modulator 110 to track the interfering signal 352, as described with reference to FIG. 1. Additionally, the controller 126 may adjust the optical signal to account for changes in a wavelength of the interfering signal source 108, as described with reference to FIG. 1.

Additionally, a second interfering signal (not shown) may be received at the EME resistant spatial light modulator 110. The second interfering signal may correspond to another light source (e.g., a second laser). In some implementations, the EME resistant spatial light modulator 110 receives the second interfering signal partially concurrently with receiving the interfering signal 352.

In other implementations, the focusing optic 332 includes multiple focusing optics (e.g., lenses). In such implementations, the multiple focusing optics may correspond to folding optics. To illustrate, the modified light signal 306 may be directed to the EME resistant spatial light modulator 110 through a series of focusing optics (e.g., lenses and/or mirrors) to generate the optical signal 308 to increase a length of a travel path of the modified light signal 306 without increasing a size of the optical signal generator 120.

In some implementations, each LCD spatial light modulator (e.g., the LCD spatial light modulators 322, 324, 326) corresponds to a portion of the EME resistant spatial light modulator 110. For example, each LCD spatial light modulator generates a portion of the optical signal which activates one or more regions of a corresponding portion of the EME resistant spatial light modulator 110. To illustrate, the first portion of the modified light signal 306 from the first LCD is directed to a first portion of the EME and the second portion of the modified light signal 306 from the second LCD is directed to a second portion of the EME. In other implementations, each LCD spatial light modulator generates an output representing the optical signal (and the resulting pattern). The outputs are combined (e.g., constructive interference) to increase an intensity of the optical signal 308.

Additionally, the plurality of LEDs 312, 314, 316, the focusing optic 332, or a combination thereof, may be adjustable. For example, an intensity or a color of light emitted by the plurality of LEDs 312, 314, 316 may be adjusted based on a wavelength of the interfering signal 352. Adjusting the intensity or the color of the light emitted by the plurality of LEDs 312, 314, 316 may reduce power consumption. As another example, a position or a focal length of the focusing optic 332 may be adjusted. To illustrate, the controller 126 may send other control signals (not shown) to the plurality of LEDs 312, 314, 316, the focusing optic 332, or a combination thereof, to adjust the plurality of LEDs 312, 314, 316, the focusing optic 332, or a combination thereof.

In some implementations, the controller 126 may generate and adjust the optical signal by activating and deactivating LEDs. To illustrate, the controller 126 may send the other control signals to the plurality of LEDs 312, 314, 316 to activate a portion the LEDs to adjust the light signal 304.

FIG. 3 also depicts illustrative, non-limiting examples of images captured by the imaging system 130. A first image 392 is representative of a negative image of the target 106 after the interfering signal 352 has been modified to form the optical vortex. The target 106 in the negative image is visible and may only be partially obscured by the interfering signal 352. A second image 394 is representative of an image of the target 106 (e.g., an aircraft) after the interfering signal 352 has been modified to form the optical vortex. As illustrated in FIG. 3, an intensity of the interfering signal 352 has been reduced in the first image 392 and in the second image 394 such that the imaging system 130 is able to capture, identify, and/or track the target 106. For example, the first image 392 includes a white region (e.g., an unexposed or underexposed region) corresponding to the optical vortex formed by modifying the interfering signal 352 and the target 106 is substantially visible (e.g., partially obscured) in the first image 392. The second image 394 includes a black region (e.g., a region of low or zero intensity light) corresponding to the optical vortex formed by modifying the interfering signal 352 and the target 106 is visible (e.g., partially obscured) in the second image 394. The black region includes one or more rings, such as a first ring 396 and a second ring 398. A first intensity of the first ring 396 is greater than a second intensity of the second ring 398. Alternatively, the one or more rings may be removed from the second image 394 during image generation, post-processing, or display. Although two rings are illustrated in FIG. 3, more than two rings or fewer than two rings may be produced in images captured by the imaging system 130. As compared to other imaging systems which capture fully or heavily obscured images of targets near light sources, the imaging system 130 may capture images of a target near a light source where the target is only partially obscured by light generated by the light source. To illustrate, when the interfering signal 352 corresponds to a red laser, images captured by other imaging systems may include a circular region of high intensity red light that obscures or partially obscures the target (e.g., the target 106).

Figure 4:
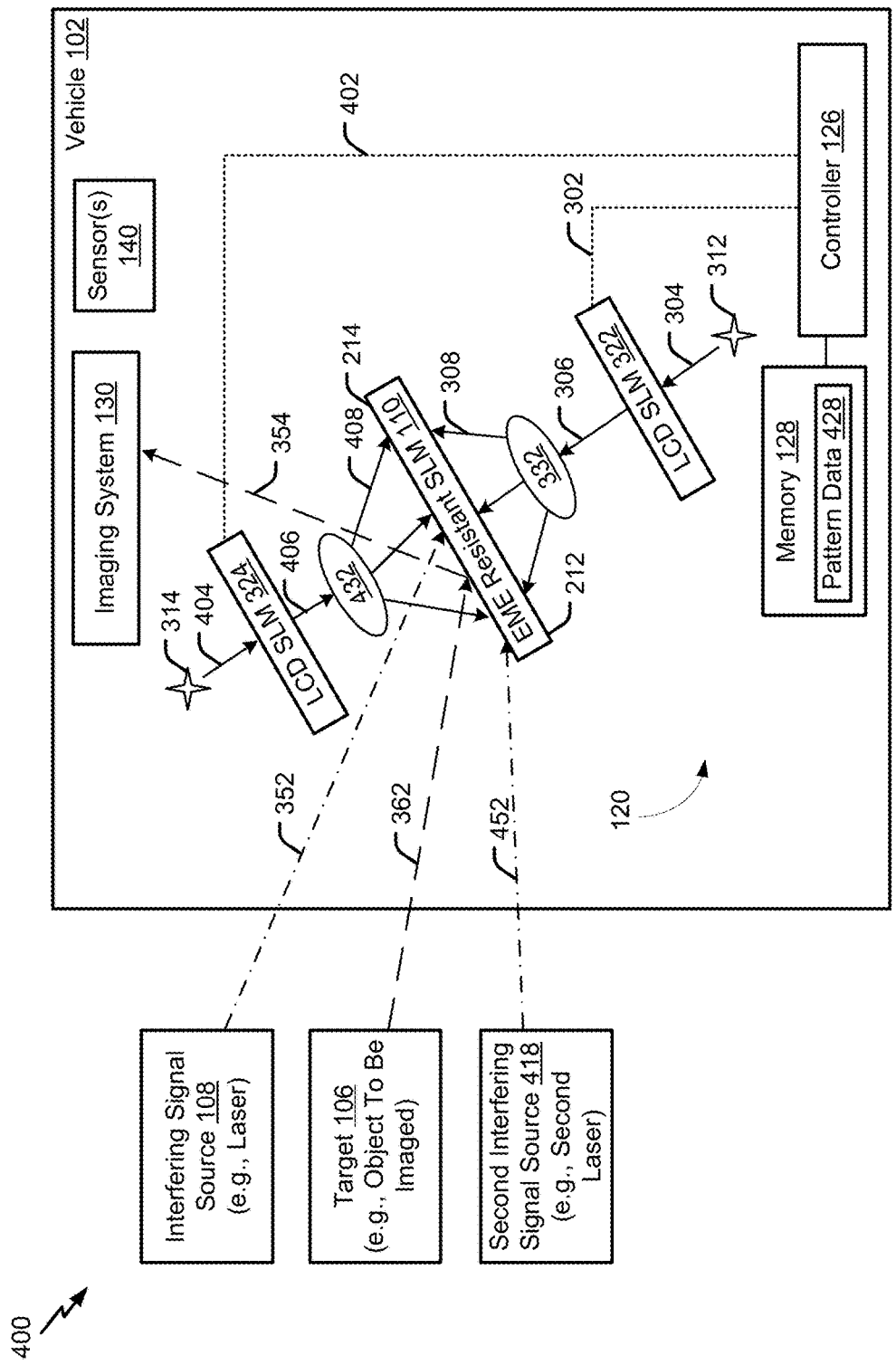
FIG. 4 is a diagram that illustrates a second example of a configuration of an optical signal generator.

FIG. 4 illustrates a diagram 400 of the vehicle 102 including another example configuration of the optical signal generator 120 of FIG. 1. As illustrated in FIG. 4, the optical signal generator 120 includes the optical source 122 which in the illustrated configuration is implemented as the plurality of LEDs 312, 314. The optical signal generator 120 also includes the focusing optics 124, which in the illustrated configuration is implemented as the LCD spatial light modulators 322, 324, the focusing optic 332, and a second focusing optic 432. The optical signal generator 120 further includes the controller 126 and the memory 128.

The example configuration of the optical signal generator 120 illustrated in FIG. 4 depicts activating the EME resistant spatial light modulator 110 by directing multiple optical signals to multiple sides of the EME resistant spatial light modulator 110. As illustrated in FIG. 4, the first plurality of LEDs 312 and the first LCD spatial light modulator 322 correspond to the first side 212 (e.g., a back side relative to the interfering signal 352). The second plurality of LEDs 314 and the second LCD spatial light modulator 324 correspond to the second side 214 (e.g., a front side or same side relative to the interfering signal 352). The first plurality of LEDs 312 and the first LCD spatial light modulator 322 provide (e.g., generate and direct) the optical signal 308 to the first side 212, and the second plurality of LEDs 314 and the second LCD spatial light modulator 324 provide a second optical signal 408 to the second side 214. To illustrate, the second plurality of LEDs 314 generates a second light signal 404. The second LCD spatial light modulator 324 modifies the second light signal 404 to generate a second modified light signal 406 responsive to second controls signals 402. The second focusing optic 432 receives the second modified light signal 406 and directs the second modified light signal 406 to the second side 214 of the EME resistant spatial light modulator 110 to generate the second optical signal 408. For example, data associated with the second optical signal 408 and the resulting pattern of conductive nanotubes may be retrieved from pattern data 428 stored at the memory 128 based on the interfering signal 352. Alternatively, the second optical signal 408 or may be determined (e.g., calculated) based on the interfering signal 352 using an algorithm stored at the memory 128. The multiple optical signals 308, 408 may be used to form one or more patterns of conductive nanotubes.

In some implementations, the second optical signal 408 is similar to the optical signal 308. For example, the second optical signal 408 may be a mirror image (e.g., a signal that is flipped along an axis) of the optical signal 308. Additionally or alternatively, the second optical signal 408 may have a wavelength that is similar to the first wavelength of the optical signal 308. In other implementations, the second optical signal 408 is different from the optical signal 308. For example, the optical signal 308 and the second optical signal 408 may each be configured to form a portion of the pattern of conductive nanotubes. To illustrate, the optical signal 308 may activate the optically-sensitized carbon nanotubes 224 of the second layer 254 from the first side 212 and the second optical signal 408 may activate the optically-sensitized carbon nanotubes 224 of the first layer 252 from the second side 214 to form the pattern of conductive nanotubes. As another example, the second optical signal 408 may be configured to form a second pattern of conductive nanotubes. As yet another example, the second optical signal 408 may include light having a wavelength that is different from the first wavelength of the optical signal 308.

The example configuration of the optical signal generator 120 illustrated in FIG. 4 may be used with EME resistant spatial light modulators that include multiple layers of nanotubes (e.g., the composite layer 256 of FIG. 2B). For example, the optical signal 308 may activate the optically-sensitized carbon nanotubes 224 of the second layer of optically-sensitized carbon nanotubes 254 from the first side 212 and the second optical signal 408 may activate the optically-sensitized carbon nanotubes 224 of the first layer of optically-sensitized carbon nanotubes 252 from the second side 214.

Although a single controller is illustrated in FIG. 4, in other implementations the optical signal generator 120 may include a second controller configured to generate the second optical signal 408. The second controller may function similar to the controller 126, as described with reference to FIGS. 1 and 3. For example, the second controller may send the second control signals 402 to the second plurality of LEDs 314 and/or the second LCD spatial light modulator 324 to generate the second optical signal 408 and to direct the second optical signal 408 to the EME resistant spatial light modulator 110.

Additionally, the configuration of the optical signal generator 120 depicted in FIG. 4 may enable generation of optical vortices for multiple interfering signals. The multiple interfering signals may be received from one or more sources. To illustrate, a second interfering signal 452 may be received at the EME resistant spatial light modulator 110 from the second interfering signal source 418. Responsive to identifying the second interfering signal source 418 or receiving the second interfering signal 452, the optical signal generator 120 may provide the second optical signal 408 to the EME resistant spatial light modulator 110 to modify the second interfering signal 452. To illustrate, the second layer of optically-sensitized carbon nanotubes forms the second pattern of conductive nanotubes. The second pattern of conductive nanotubes modifies the second interfering signal 452 to form a second optical vortex, which reduces an intensity of the second interfering signal 452.

By using multiple control signals, multiple patterns may be formed concurrently on the EME resistant spatial light modulator 110. Accordingly, the EME resistant spatial light modulator 110 may cause multiple optical vortices to be generated and thus may protect against multiple light sources. Additionally, activating the EME resistant spatial light modulator 110 from multiple sides may provide increased efficiency in activating areas (e.g., the activatable regions 282) when using EME resistant spatial light modulators with a single layer (e.g., the layer of optically-sensitized carbon nanotubes 204) of nanotubes or when using EME resistant spatial light modulators with multiple layers of nanotubes, such as the layers of optically-sensitized carbon nanotubes 252 and 254. Furthermore, by activating the EME resistant spatial light modulator 110 from multiple sides, the EME resistant spatial light modulator 110 may have increased resistance to optical interference as compared to EME resistant spatial light modulators that are activated from a single side. For example, the EME resistant spatial light modulator 110 may be more resistant to disruption of the pattern of conductive nanotubes caused by the interfering signal 352 being absorbed by the optically-sensitized carbon nanotubes.

Figure 5:
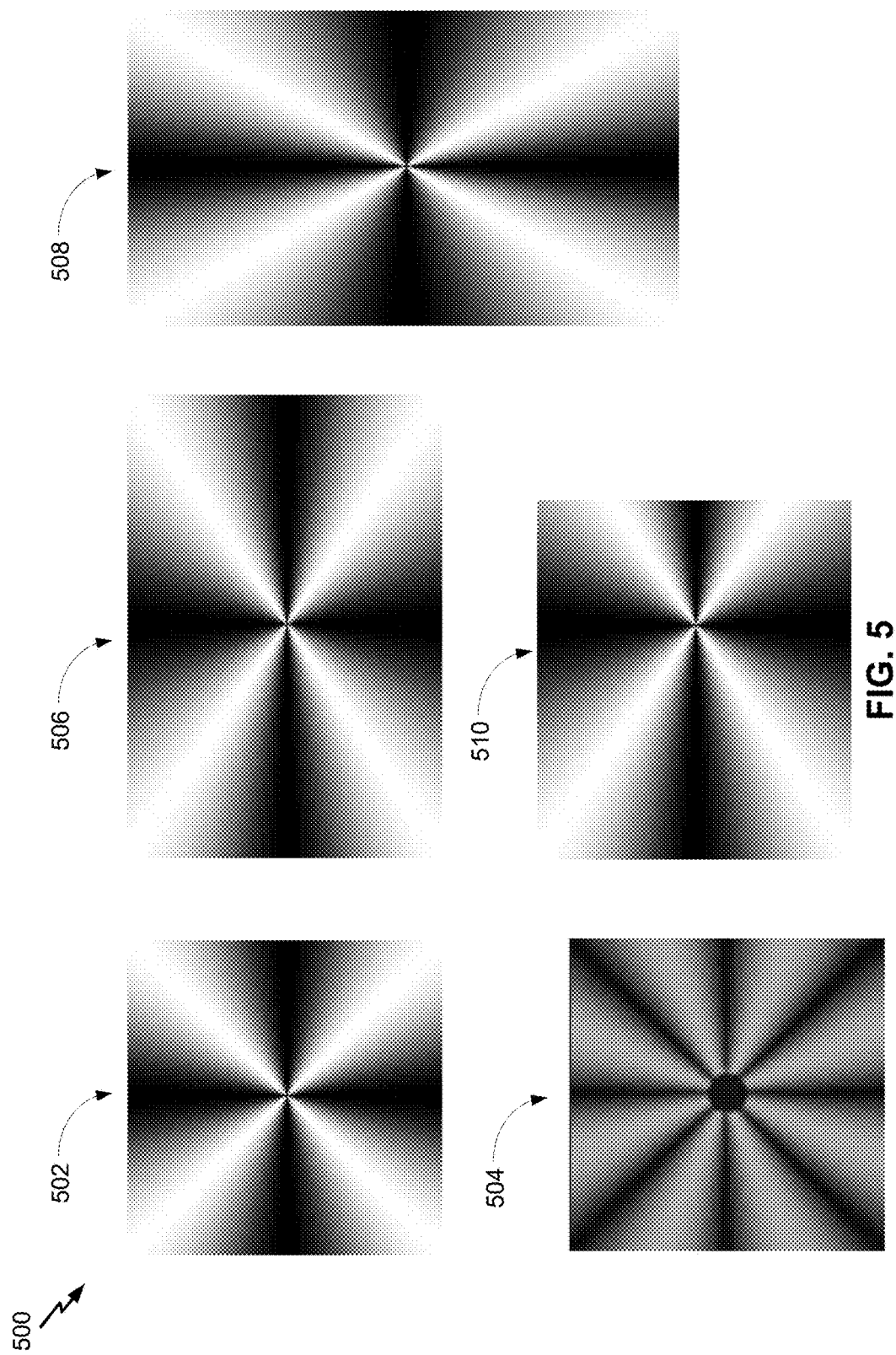
FIG. 5 is a diagram that illustrates an example of patterns of conductive nanotubes.

FIG. 5 illustrates a diagram 500 of examples of patterns 502-510 of conductive nanotubes of an EME resistant spatial light modulator formed by optical signals. A first pattern 502 is illustrated as a having four light regions and four dark regions. The first pattern 502 illustrates a representation of polarized light of a vortex optical element that causes an electric field of incoming light to rotate through two rotations as the incoming light moves around the center of the vortex optical element. A second pattern 504 is illustrated as a having eight light regions, eight dark regions, and a dark circular region at a center of the second pattern 504. The second pattern 504 illustrates a representation of polarized light of a vortex optical element that causes an electric field of incoming light to rotate through four rotations as the incoming light moves around the center of the vortex optical element. The first and second patterns 502 and 504 have rotational symmetry and may correspond to spiral type patterns. The term spiral type pattern denotes an effect on incoming light rather than a configuration of the pattern.

Figure 6:
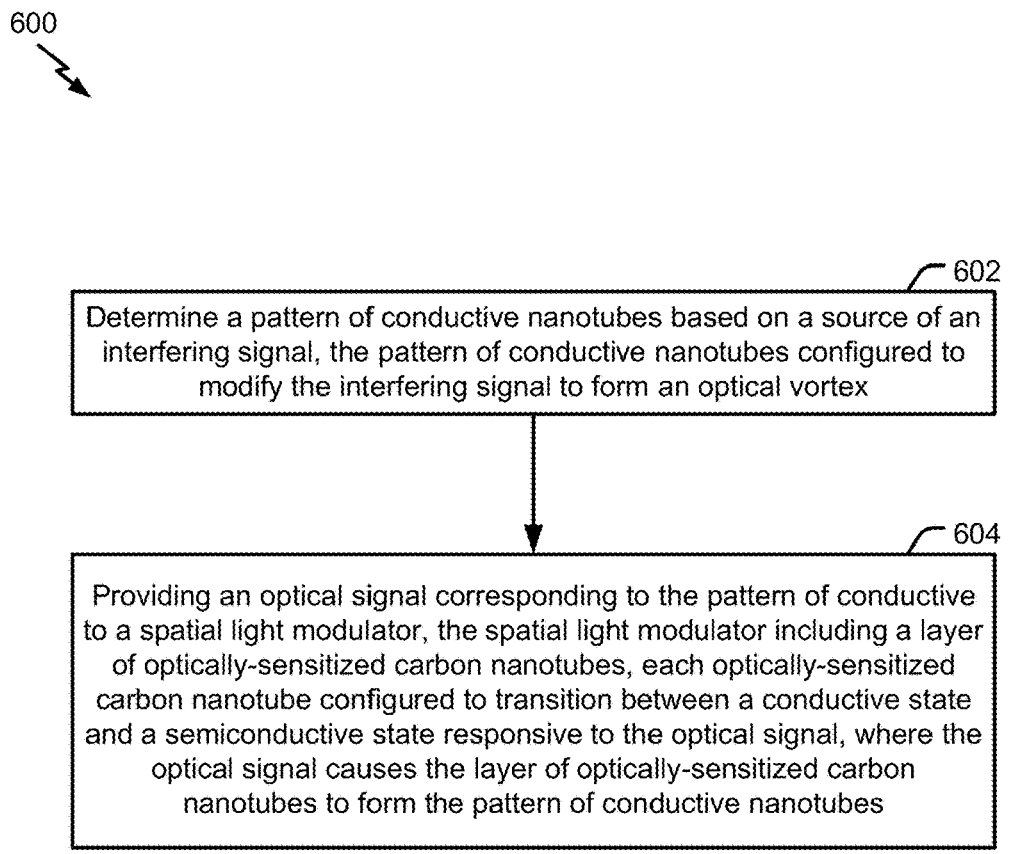
FIG. 6 is a flow chart of an example of a method of generating an optical vortex.

A third pattern 506 illustrates an example adjustment to the first pattern 502. In response to the interfering signal (or a source thereof) being moved in a horizontal direction (e.g., left or right as illustrated in FIG. 6) relative to the EME resistant spatial light modulator, the first pattern 502 may be stretched horizontally (e.g., elongated along a horizontal axis) to produce the third pattern 506. A fourth pattern 508 illustrates another example adjustment to the first pattern 502. In response to the interfering signal being moved in a vertical direction (e.g., up or down as illustrated in FIG. 6) relative to the EME resistant spatial light modulator, the first pattern 502 may be stretched horizontally (e.g., elongated along a vertical axis) to produce the fourth pattern 508. A fifth pattern 510 illustrates another example adjustment to the first pattern 502. In response to the interfering signal being moved in a horizontal direction (e.g., left as illustrated in FIG. 6) relative to EME resistant spatial light modulator, the first pattern 502 may be skewed horizontally (e.g., left as illustrated in FIG. 6) to produce the fifth pattern 510. Additionally or alternatively, the first pattern 502 may be adjusted for movement of the EME resistant spatial light modulator relative to the source of the interfering light. In some implementations, the EME resistant spatial light modulator may form a composite pattern that includes multiple patterns, such as by overlaying a first pattern on a second pattern.

FIG. 6 illustrates a method 600 of generating an optical vortex. The method 600 may be performed by the reconfigurable optical device of FIG. 1, the optical signal generator 120 of FIG. 1, or the controller 126 of FIG. 1. The method 600 includes, at 602, determining a pattern of conductive nanotubes based on a source of interfering signal. The pattern of conductive nanotubes is configured to modify the interfering signal to form an optical vortex. The pattern may include or correspond to the pattern of FIG. 1, the exemplary pattern 292 of FIG. 2B, or the patterns 502-510 of FIG. 5. The pattern may be generated responsive to the optical signal 308 of FIGS. 3 and 4, the second optical signal 408 of FIG. 4, or both. The pattern may be determined based on a direction and distance of the interfering signal. Additionally, the pattern may be determined on a position of the source of the interfering signal, as described with reference to FIG. 1. In some implementations, the optical vortex corresponds to a vectorial optical vortex. In such implementations, the pattern may correspond to a half-wave plate in which optical axes of the interfering signal rotate around a center of the pattern.

The method 600 further includes, at 604, providing an optical signal corresponding to the pattern to a spatial light modulator. The spatial light modulator includes a layer of optically-sensitized carbon nanotubes, each optically-sensitized carbon nanotube configured to transition between a conductive state and a semiconductive state responsive to an optical signal. The optical signal causes the layer of optically-sensitized carbon nanotubes to form the pattern of conductive nanotubes. The optical signal may include or correspond to the optical signal 308 of FIGS. 3 and 4, the second optical signal 408 of FIG. 4, or both, and the interfering signal may include or correspond to the interfering signal 352 of FIG. 3, the second interfering signal 452 of FIG. 4, or both. The spatial light modulator may include or correspond to the EME resistant spatial light modulator 110 of FIGS. 1-4. The spatial light modulator may be resistant to electromagnetic effects from the interfering signal which has a wavelength greater than a wavelength of the optical signal. The layer of optically-sensitized carbon nanotubes may include or correspond to the layer of optically-sensitized carbon nanotubes 204 of FIG. 2A, the composite layer 256 of FIG. 2B, or both.

In some implementations, the method 600 includes determining the optical signal based on the pattern. For example, the controller 126 may retrieve or calculate the optical signal such that the optical signal causes the EME resistant spatial light modulator 110 to form the pattern of conductive nanotubes.

In some implementations, the method 600 includes adjusting the optical signal based on movement of the source of the interfering signal, movement of a platform which includes the spatial light modulator, or both. The optical signal may be adjusted to cause the pattern to move (e.g., shift a position of the pattern or to skew the pattern, such as adjust the eccentricity of the pattern) relative to the interfering signal, as described with reference to FIGS. 1 and 3. The platform may include or correspond to the vehicle 102 of FIG. 1 or an aircraft 702 of FIG. 7. The source of the interfering signal may include or correspond to the interfering signal source 108, the second interfering signal source 418, or both.

In some implementations, the method 600 includes identifying a target to be imaged. For example, sensor data may be used to identify the target or information identifying the target may be received from an external source. The method 600 also includes initiating search of potential sources of the interfering signal associated with the target. For example, the controller 126 may search the memory 128 for the potential sources of the interfering signal associated with the target 106, generate a request for information from an external database, or both. The method 600 includes identifying the source of the interfering signal. For example, the controller 126 may retrieve from the memory 128 or receive from the external database the source of the interfering signal associated with the target 106. The method 600 further includes retrieving the pattern that corresponds to the source of the interfering signal. For example, the controller 126 may search the memory 128 for the pattern that corresponds to the source of the interfering signal, generate a request for information corresponding to the pattern that corresponds to the source of the interfering signal, or both, as described with reference to FIGS. 1 and 3. In some implementations, the target is separate from the source of the interfering signal.

In some implementations, the spatial light modulator includes a single layer of carbon nanotubes. In other implementations, the spatial light modulator includes multiple layers of carbon nanotubes. To illustrate, the spatial light modulator may include a second layer of optically-sensitized carbon nanotubes. For example, the first and second layers of optically-sensitized carbon nanotubes may form the composite layer 256 of FIG. 2B. In such implementations, the optical signal generator is configured to provide the optical signal to the spatial light modulator to cause the second layer of optically-sensitized carbon nanotubes to form the pattern of conductive nanotubes. Alternatively, the optical signal generator is configured to direct a second optical signal (e.g., the second optical signal 408) to the spatial light modulator to cause the second layer of optically-sensitized carbon nanotubes to form a second pattern of conductive nanotubes, as described with reference to FIG. 4.

Figure 7:
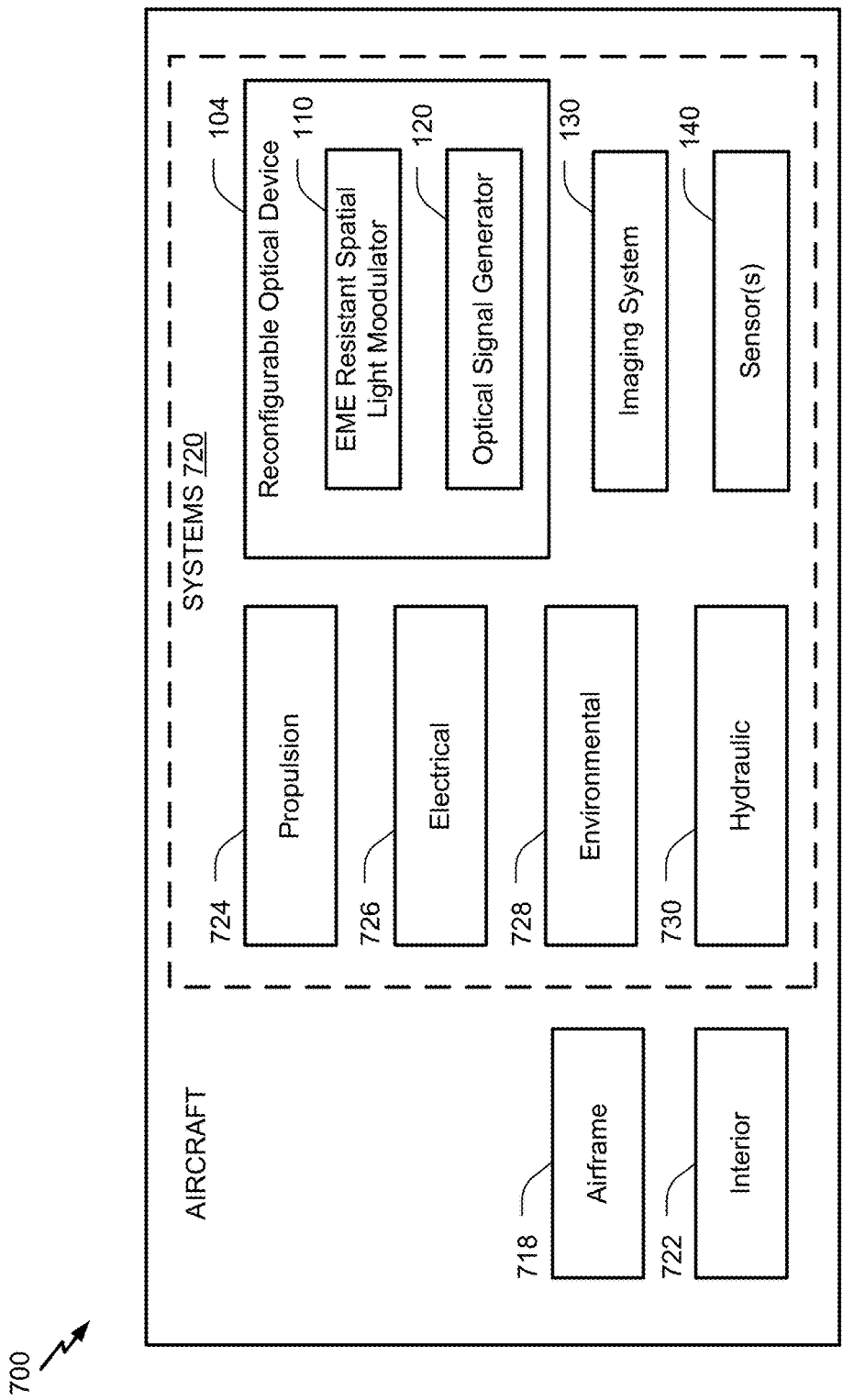
FIG. 7 is a block diagram of an illustrative implementation of an aircraft including a reconfigurable optical device.

Referring to FIG. 7, a block diagram of an illustrative embodiment of an aircraft is shown and designated 700. As shown in FIG. 7, the aircraft 702 may include an airframe 718, an interior 722, and a plurality of systems 720. The systems 720 includes a propulsion system 724, an electrical system 726, a hydraulic system 730, an environmental system 728, the reconfigurable optical device 104, the imaging system 130, and the one or more sensors 140. In some implementations, the systems 720 include more or fewer systems than illustrated in FIG. 7. The reconfigurable optical device 104 includes the EME resistant spatial light modulator 110 and the optical signal generator 120 of FIG. 1. The EME resistant spatial light modulator 110 includes one or more layers, such as the optical substrate 202, the layer of optically-sensitized carbon nanotubes 204, and the protective layer 206 of FIG. 2. The optical signal generator 120 includes the optical source 122, the focusing optics 124, the controller 126, and the memory 128. The reconfigurable optical device 104 is configured to generate one or more optical vortices and to protect the imaging system 130. For example, the reconfigurable optical device 104 or the controller 126 may be configured to execute computer-executable instructions (e.g., a program of one or more instructions) stored in a memory, such as the memory 128 of FIG. 1. The instructions, when executed, cause the controller 126 to perform one or more operations of the method 600 of FIG. 6.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A reconfigurable optical device comprising:
a spatial light modulator comprising a layer of optically-sensitized carbon nanotubes, each optically-sensitized carbon nanotube configured to transition between a conductive state and a semiconductive state responsive to an optical signal; and
an optical signal generator configured to provide the optical signal to the spatial light modulator to cause the layer of optically-sensitized carbon nanotubes to form a pattern of conductive nanotubes, the pattern of conductive nanotubes configured to modify an interfering signal to form an optical vortex.

2. The reconfigurable optical device of claim 1, wherein the spatial light modulator is configured to receive a reflection signal corresponding to reflected light from an image target and to direct the reflection signal to an imaging system, the imaging system configured to generate image data based on the reflection signal.

3. The reconfigurable optical device of claim 1, wherein each optically-sensitized carbon nanotube includes one or more quantum dots, wherein the optically-sensitized carbon nanotubes comprise single-walled carbon nanotubes, and wherein the single-walled carbon nanotubes have a chiral angle that is associated with semiconductive carbon nanotubes.

4. The reconfigurable optical device of claim 3, wherein the one or more quantum dots are configured to absorb the optical signal to generate a charge, wherein the charge causes an optically-sensitized carbon nanotube to transition from the semiconductive state to the conductive state.

5. The reconfigurable optical device of claim 1, wherein the spatial light modulator further comprises a second layer of optically-sensitized carbon nanotubes, wherein the optical signal generator is further configured to provide a second optical signal to the spatial light modulator to cause the second layer of optically-sensitized carbon nanotubes to form a second pattern of conductive nanotubes, wherein the pattern of conductive nanotubes and the second pattern of conductive nanotubes modify the interfering signal to form the optical vortex, and wherein the optical vortex reduces an intensity of the interfering signal.

6. The reconfigurable optical device of claim 1, wherein the spatial light modulator further comprises a second layer of optically-sensitized carbon nanotubes configured to form the pattern of conductive nanotubes responsive to receiving the optical signal, wherein the layer of optically-sensitized carbon nanotubes includes carbon nanotubes aligned in a first direction, and wherein the second layer of optically-sensitized carbon nanotubes includes carbon nanotubes aligned in a second direction that is different from the first direction.

7. The reconfigurable optical device of claim 1, wherein the optical signal has a first wavelength that is less than a second wavelength of the interfering signal, and wherein the optical vortex reduces an intensity of the interfering signal.

8. The reconfigurable optical device of claim 1, wherein the interfering signal is generated by a laser weapon or a laser targeting system.

9. The reconfigurable optical device of claim 1, wherein the optical signal generator includes:
   one or more light emitting diodes configured to generate light corresponding to the optical signal;
   one or more liquid-crystal display spatial light modulators configured to modify the light and to direct the optical signal to a lens; and
   the lens configured to direct the optical signal to the spatial light modulator.

10. The reconfigurable optical device of claim 1, further comprising a memory configured to store pattern data associated with wavelengths of external interfering signal sources, position data associated with positions of the external interfering signal sources, or both.

11. The reconfigurable optical device of claim 10, wherein the optical signal generator comprises a controller configured to determine the pattern of conductive nanotubes based on the pattern data, the position data, sensor data, information received from an external source, or a combination thereof.

12. The reconfigurable optical device of claim 1, wherein the pattern of conductive nanotubes is further configured to modify a second interfering signal to form a second optical vortex, the second interfering signal corresponding to a second laser weapon or a second laser targeting system.

13. The reconfigurable optical device of claim 1, wherein the spatial light modulator and the optical signal generator are included on board an aircraft, a helicopter, an airship, a satellite, a spacecraft, a rocket, a ship, a vehicle, or a weapon.

14. The reconfigurable optical device of claim 1, wherein the optical signal generator is configured to adjust the optical signal based on movement of a platform which includes the spatial light modulator, based on movement of a source of the interfering signal, or both, and wherein adjusting the optical signal adjusts the pattern of conductive nanotubes.

15. The reconfigurable optical device of claim 14, wherein the platform includes one or more sensors configured to generate movement data based the movement of the platform, the movement of the source of the interfering signal, or both, and wherein the optical signal generator is configured to adjust the optical signal based on the movement data.

16. An imaging system comprising:
   a spatial light modulator comprising a layer of optically-sensitized carbon nanotubes, each optically-sensitized carbon nanotube configured to transition between a conductive state and a semiconductive state responsive to an optical signal; and
   an optical signal generator configured to provide the optical signal to the spatial light modulator to cause the layer of optically-sensitized carbon nanotubes to form a pattern of conductive nanotubes, the pattern of conductive nanotubes configured to modify an interfering signal to form an optical vortex; and
   an image sensor configured to capture a reflection signal and generate image data based on the reflection signal, wherein the spatial light modulator is configured to receive the reflection signal corresponding to reflected light from an image target and to direct the reflection signal to the image sensor.

17. The imaging system of claim 16, wherein the optical signal generator comprises a controller configured to determine the pattern of conductive nanotubes based on a direction of the interfering signal, wherein the pattern of conductive nanotubes corresponds to a spiral pattern, and wherein an eccentricity of the spiral pattern corresponds to the direction of the interfering signal.

18. The imaging system of claim 17, wherein the spatial light modulator includes multiple layers of optically-sensitized carbon nanotubes, and wherein the controller is further configured to select the layer of optically-sensitized carbon nanotubes based on a wavelength of the interfering signal.

19. A method comprising:
   determining a pattern of conductive nanotubes based on a source of interfering signal, the pattern of conductive nanotubes configured to modify the interfering signal to form an optical vortex;
   directing an optical signal corresponding to the pattern of conductive nanotubes to a spatial light modulator, the spatial light modulator comprising a layer of optically-sensitized carbon nanotubes, each optically-sensitized carbon nanotube configured to transition between a conductive state and a semiconductive state responsive to an optical signal, wherein the optical signal causes the layer of optically-sensitized carbon nanotubes to form the pattern of conductive nanotubes.

20. The method of claim 19, further comprising adjusting the optical signal based on movement of the source of the interfering signal, movement of a platform which includes the spatial light modulator, or both, wherein adjusting the optical signal causes the pattern of conductive nanotubes to shift or skew relative to the interfering signal.

21. The method of claim 19, further comprising:
   identifying a target to be imaged;
   initiating search of potential sources of the interfering signal associated with the target;
   identifying the source of the interfering signal; and
   retrieving the pattern of conductive nanotubes that corresponds to the source of the interfering signal.

22. The method of claim 21, wherein the target is separate from the source of the interfering signal, wherein the pattern of conductive nanotubes is determined based on a position of the source of the interfering signal and a wavelength of the interfering signal, and wherein the spatial light modulator is resistant to electromagnetic effects.

* * * * *

UNITED STATES PATENT AND TRADEMARK OFFICE
CERTIFICATE OF CORRECTION

PATENT NO. : 10,108,069 B2
APPLICATION NO. : 15/414072
DATED : January 24, 2017
INVENTOR(S) : Thomas L. Weaver It is certified that error appears in the above-identified patent and that said Letters Patent is hereby corrected as shown below:

In the Claims

Column 27, Claim 15, Line 49, "based the movement" should read --based on the movement--.

Signed and Sealed this
Twenty-ninth Day of January, 2019

Andrei Iancu
*Director of the United States Patent and Trademark Office*